US00RE41961E

(19) United States
(12) Reissued Patent
Chu

(10) Patent Number: US RE41,961 E
(45) Date of Reissued Patent: *Nov. 23, 2010

(54) PASSWORD PROTECTED MODULAR COMPUTER METHOD AND DEVICE

(75) Inventor: William W. Y. Chu, Los Altos, CA (US)

(73) Assignee: ACQIS Technology, Inc., Mountain View, CA (US)

( * ) Notice: This patent is subject to a terminal disclaimer.

(21) Appl. No.: 10/963,825

(22) Filed: Oct. 12, 2004

Related U.S. Patent Documents

Reissue of:
(64) Patent No.: 6,321,335
Issued: Nov. 20, 2001
Appl. No.: 09/183,493
Filed: Oct. 30, 1998

(51) Int. Cl.
*H04L 9/00* (2006.01)

(52) U.S. Cl. ..... 713/193; 710/301; 726/9; 726/18; 726/28

(58) Field of Classification Search ..... 361/687; 711/164; 713/189, 193, 164, 172, 190, 194; 726/2, 9, 17, 18, 19, 20, 28; 710/100, 301
See application file for complete search history.

(56) References Cited

U.S. PATENT DOCUMENTS

| | | | |
|---|---|---|---|
| 3,996,585 | A | 12/1976 | Hogan |
| 4,623,964 | A | 11/1986 | Getz et al. |
| 4,700,362 | A | 10/1987 | Todd et al. |
| 4,769,764 | A | 9/1988 | Levanon |
| 4,872,091 | A | 10/1989 | Maniwa et al. |
| 4,890,282 | A | 12/1989 | Lambert et al. |
| 4,918,572 | A | 4/1990 | Tarver et al. |
| 4,939,735 | A | 7/1990 | Fredericks et al. |
| 5,056,141 | A | 10/1991 | Dyke |
| 5,086,499 | A | 2/1992 | Mutone |
| 5,103,446 | A | 4/1992 | Fischer |

(Continued)

FOREIGN PATENT DOCUMENTS

| | | |
|---|---|---|
| EP | 722138 A1 | 7/1996 |
| JP | 6-289953 | 10/1994 |
| WO | WO 92/18924 | 10/1992 |
| WO | WO 94/00097 | 1/1994 |
| WO | WO 95/13640 | 5/1995 |
| WO | WO97/00481 | 1/1997 |

OTHER PUBLICATIONS

Bernal, Carlos, product brochure entitled: "PowerSMP Series 4000", (Mar. 1998) <<http://www/winnetmag.com/Windows/Article/ArticleID/3095/3095.html, downloaded from web on Jun. 22, 2004, 2 pgs.

(Continued)

*Primary Examiner*—Beemnet W Dada
(74) *Attorney, Agent, or Firm*—Cooley LLP

(57) ABSTRACT

A method and device for securing a removable Attached Computer Module ("ACM") 10. ACM 10 inserts into a Computer Module Bay ("CMB") 40 within a peripheral console to form a functional computer such as a desktop computer or portable computer. The present ACM 10 includes a locking system, which includes hardware and software 600, 700, to prevent accidental removal or theft of the ACM from the peripheral console. While ACM is in transit, further security is necessary against illegal or unauthorized use. If ACM contains confidential data, a high security method is needed to safeguard against theft.

7 Claims, 14 Drawing Sheets

U.S. PATENT DOCUMENTS

| | | | | |
|---|---|---|---|---|
| 5,191,581 | A | | 3/1993 | Woodbury et al. |
| 5,251,097 | A | | 10/1993 | Simmons et al. |
| 5,278,509 | A | | 1/1994 | Haynes et al. |
| 5,278,730 | A | | 1/1994 | Kikinis |
| 5,293,497 | A | | 3/1994 | Free |
| 5,311,397 | A | | 5/1994 | Harshberger et al. |
| 5,317,477 | A | | 5/1994 | Gillett |
| 5,319,771 | A | | 6/1994 | Takeda |
| 5,331,509 | A | | 7/1994 | Kikinis |
| 5,355,391 | A | | 10/1994 | Horowitz et al. |
| 5,428,806 | A | | 6/1995 | Pocrass |
| 5,436,857 | A | | 7/1995 | Nelson et al. |
| 5,463,742 | A | | 10/1995 | Kobayashi |
| 5,519,843 | A | | 5/1996 | Moran et al. |
| 5,539,616 | A | | 7/1996 | Kikinis |
| 5,550,710 | A | | 8/1996 | Rahamim et al. |
| 5,550,861 | A | | 8/1996 | Chan et al. |
| 5,572,441 | A | | 11/1996 | Boie |
| 5,578,940 | A | | 11/1996 | Dillon |
| 5,600,800 | A | | 2/1997 | Kikinis et al. |
| 5,603,044 | A | | 2/1997 | Annapareddy et al. |
| 5,606,717 | A | | 2/1997 | Farmwald et al. |
| 5,608,608 | A | * | 3/1997 | Flint et al. ..... 361/679.32 |
| 5,623,637 | A | * | 4/1997 | Jones et al. ..... 711/164 |
| 5,630,057 | A | | 5/1997 | Hait |
| 5,638,521 | A | | 6/1997 | Buchala et al. |
| 5,640,302 | A | | 6/1997 | Kikinis |
| 5,648,762 | A | | 7/1997 | Ichimura et al. |
| 5,659,773 | A | | 8/1997 | Huynh et al. |
| 5,663,661 | A | | 9/1997 | Dillon et al. |
| 5,673,174 | A | | 9/1997 | Hamirani |
| 5,680,126 | A | | 10/1997 | Kikinis |
| 5,689,654 | A | | 11/1997 | Kikinis |
| 5,721,837 | A | | 2/1998 | Kikinis |
| 5,721,842 | A | | 2/1998 | Beasley et al. |
| 5,745,733 | A | | 4/1998 | Robinson |
| 5,751,711 | A | | 5/1998 | Sakaue |
| 5,752,080 | A | | 5/1998 | Ryan |
| 5,764,924 | A | | 6/1998 | Hong |
| 5,774,704 | A | | 6/1998 | Williams |
| 5,795,228 | A | | 8/1998 | Trumbull |
| 5,802,391 | A | | 9/1998 | Hwang |
| 5,809,538 | A | | 9/1998 | Pollmann |
| 5,815,681 | A | | 9/1998 | Kikinis |
| 5,819,050 | A | | 10/1998 | Boehling et al. |
| 5,826,048 | A | | 10/1998 | Dempsey et al. |
| 5,838,932 | A | | 11/1998 | Alzien |
| 5,848,249 | A | | 12/1998 | Garbus |
| 5,859,669 | A | | 1/1999 | Prentice |
| 5,862,381 | A | * | 1/1999 | Advani et al. ..... 717/125 |
| 5,884,053 | A | | 3/1999 | Clouser et al. |
| 5,907,566 | A | | 5/1999 | Benson et al. |
| 5,933,609 | A | | 8/1999 | Walker et al. |
| 5,941,965 | A | | 8/1999 | Moroz |
| 5,948,047 | A | | 9/1999 | Jenkins et al. |
| 5,960,213 | A | | 9/1999 | Wilson |
| 5,968,144 | A | | 10/1999 | Walker et al. |
| 5,971,804 | A | | 10/1999 | Gallagher et al. |
| 5,977,989 | A | | 11/1999 | Lee et al. |
| 5,978,919 | A | | 11/1999 | Doi et al. |
| 5,982,363 | A | | 11/1999 | Naiff |
| 5,991,163 | A | | 11/1999 | Marconi et al. |
| 5,991,844 | A | | 11/1999 | Khosrowpour |
| 5,999,952 | A | | 12/1999 | Jenkins et al. |
| 6,002,442 | A | | 12/1999 | Li et al. |
| 6,003,105 | A | | 12/1999 | Vicard et al. |
| 6,006,243 | A | | 12/1999 | Karidis |
| 6,009,488 | A | | 12/1999 | Kavipurapu |
| 6,011,546 | A | | 1/2000 | Bertram |
| 6,012,145 | A | | 1/2000 | Mathers et al. |
| 6,016,252 | A | | 1/2000 | Pignolet et al. |
| 6,028,643 | A | | 2/2000 | Jordan et al. |
| 6,029,183 | A | | 2/2000 | Jenkins et al. |
| 6,038,621 | A | | 3/2000 | Gale et al. |
| 6,040,792 | A | | 3/2000 | Watson et al. |
| 6,046,571 | A | | 4/2000 | Bovio et al. |
| 6,052,513 | A | | 4/2000 | MacLaren |
| 6,069,615 | A | | 5/2000 | Abraham et al. |
| 6,070,211 | A | | 5/2000 | Neal et al. |
| 6,070,214 | A | | 5/2000 | Ahern |
| 6,088,224 | A | | 7/2000 | Gallagher et al. |
| 6,088,752 | A | | 7/2000 | Ahern |
| 6,104,921 | A | | 8/2000 | Cosley et al. |
| 6,157,534 | A | | 12/2000 | Gallagher et al. |
| 6,163,464 | A | | 12/2000 | Ishibashi et al. |
| 6,175,490 | B1 | | 1/2001 | Papa et al. |
| 6,202,169 | B1 | | 3/2001 | Razzaghe-Ashrafi et al. |
| 6,208,522 | B1 | | 3/2001 | Manweiler et al. |
| 6,216,185 | B1 | | 4/2001 | Chu |
| 6,256,689 | B1 | | 7/2001 | Khosrowpour |
| 6,260,155 | B1 | | 7/2001 | Dellacona |
| 6,266,539 | B1 | | 7/2001 | Pardo |
| 6,289,376 | B1 | | 9/2001 | Taylor et al. |
| 6,304,895 | B1 | | 10/2001 | Schneider et al. |
| 6,311,268 | B1 | | 10/2001 | Chu |
| 6,314,522 | B1 | | 11/2001 | Chu et al. |
| 6,317,329 | B1 | | 11/2001 | Dowdy et al. |
| 6,321,335 | B1 | | 11/2001 | Chu |
| 6,325,636 | B1 | | 12/2001 | Hipp et al. |
| 6,332,180 | B1 | | 12/2001 | Kauffman et al. |
| 6,345,330 | B2 | | 2/2002 | Chu |
| 6,366,951 | B1 | | 4/2002 | Schmidt |
| 6,378,009 | B1 | | 4/2002 | Pinkston, II et al. |
| 6,381,602 | B1 | | 4/2002 | Shoroff et al. |
| 6,393,561 | B1 | | 5/2002 | Hagiwara et al. |
| 6,401,124 | B1 | | 6/2002 | Yang et al. |
| 6,411,506 | B1 | | 6/2002 | Hipp et al. |
| 6,425,033 | B1 | | 7/2002 | Conway et al. |
| 6,452,789 | B1 | | 9/2002 | Pallotti et al. |
| 6,452,790 | B1 | | 9/2002 | Chu et al. |
| 6,453,344 | B1 | | 9/2002 | Ellsworth |
| 6,496,361 | B2 | | 12/2002 | Kim et al. |
| 6,549,966 | B1 | | 4/2003 | Dickens et al. |
| 6,564,274 | B1 | | 5/2003 | Heath et al. |
| 6,578,103 | B1 | | 6/2003 | Hill et al. |
| 6,581,125 | B1 | | 6/2003 | Lange et al. |
| 6,643,777 | B1 | | 11/2003 | Chu |
| 6,718,415 | B1 | | 4/2004 | Chu |
| 6,725,317 | B1 | | 4/2004 | Bouchier et al. |
| 6,747,878 | B1 | | 6/2004 | Hipp et al. |
| 6,985,967 | B1 | | 1/2006 | Hipp |
| 7,099,981 | B2 | | 8/2006 | Chu |
| 7,146,446 | B2 | | 12/2006 | Chu |
| 7,339,786 | B2 | | 3/2008 | Bottom et al. |
| 2001/0011312 | A1 | | 8/2001 | Chu |

OTHER PUBLICATIONS

Cragle, Jonathan, "Density System 1100", May 1999) <<http://www.winnetmag.com/Windows/Article/ArticleID/5199/5199.html, downloaded from web on Jun. 21, 2004, 4 pgs.

Feldman, Jonathan, "Rack Steady: The Four Rack–Mounted Servers That Rocked Our Network", <<http://www.networkcomputing.com/shared/printArticle.jhtml?article=/910/910r3side1.htm...>> Jun. 23, 2004, 3 pgs.

Fetters, Dave, "Cubix High–Density Server Leads the Way With Standout Management Software", (Feb. 8, 1999) <<http://www.nwc.com/shared/printArticle.jhtml?article=/1003/1003r3full.html&pub=nwc>>, downloaded from web on Jun. 23, 2004, 5 pgs.

Gardner, Michael and Null, Christopher, "A Server Condominium", <<http://www.lantimes.com/testing/98jun/806a042a.html>>, Jun. 23, 2004, 3 pgs.

Harrison, Dave, "VME in the Military: The M1A2 Main Battle Tank Upgrade Relies on COTS VME", <<http://www.dy4.com>>, (Feb. 9, 1998), pp. 1–34.

Williams, Dennis, "Consolidated Servers", (Feb. 17, 1997) <<http://www.lantimes.com/testing/97compare/pccon-sol.html>>, downloaded from web on Jun. 23, 2004, 2 pgs.

Williams, Dennis, "Executive Summary: Consolidate Now", (Feb. 17, 1997) <<http://www.lantimes.com/testing/97feb/702b064a.html>>, downloaded from web on Jun. 23, 2004, 2 pgs.

Williams, Dennis, "Top Scores for Useability and Openness", (Feb. 17, 1997) <<http://www.lantimes.com/testing/97feb/702b064a.html>>, downloaded from web on Jun. 23, 2004, 2 pgs.

Williams, Dennis, "ChatCom Inc. Chattlebox", (Feb. 17, 1997) <<http://www.lantimes.com/testing/97feb/702b066a.html>>, downloaded from web on Jun. 23, 2004, 3 pgs.

Williams, Dennis, "EVERSYS Corp. System 8000", (Feb. 17, 1997) <<http://www.lantimes.com/testing/97feb/702b070b.html>>, downloaded from web on Jun. 22, 2004, 4 pgs.

Williams, Dennis, "Cubix Corp. ERS/FT II", (Feb. 17, 1997) <<http://www.lantimes.com/testing/97feb/702b068b.html>>, downloaded from web on Jun. 23, 2004, 4 pgs.

Crystal Advertisement for "Rackmount Computers", (© 2000–2004) <<http://www.crystalpc.com/products/roservers.asp>>, downloaded from web on Jun. 17, 2004, 8 pgs.

Crystal Advertisement for "QuickConnect® Cable Management", (© 2000–2004) <<http://www.crystalpc.com/products/quickconnect.asp>>, downloaded from web on Jun. 17, 2004, 4 pgs.

Cubix Product Brochure entitled, "Density System", (© 2000) <<http://64.173.211.7/support/techinfo/system/density/density10.htm>>, downloaded from web on Jun. 22, 2004, 3 pgs.

Cubix Product Brochure entitled, "Density System, Technical Specifications", (© 2000) <<http://64.173.211.7/support/techinfo/system/density/info/spec.htm>>, downloaded from web on Jun. 22, 2004, 2 pgs.

Cubix Product Manual entitled, "Density System", Chapter 1—Introduction, (© 2000) <<http://64.173.211.7/support/techinfo/manuals/density/Chap–1.htm>>, downloaded from web on Jun. 22, 2004, 5 pgs.

Cubix, "Click on the front panel that matches your system", (© 2000) <<http://64.173.211.7/support/techinfo/system/density/density.htm>>, downloaded from web on Jun. 22, 2004, 1 pg.

Cubix Product Manual entitled, "Density System", Chapter 2—Installation, (© 2000) <<http://64.173.211.7/support/techinfo/manuals/density/Chap–2.htm>>, downloaded from web on Jun. 22, 2004, 9 pgs.

Cubix Product Manual entitled, "Density System", Chapter 3—Operation, (© 2000) <<http://64.173.211.7/support/techinfo/manuals/density/Chap–3.htm>>, downloaded from web on Jun. 22, 2004, 4 pgs.

Cubix Product Manual entitled, "Density System", Chapter 4—Maintenance and Repair, (© 2000) <<http://64.173.211.7/support/techinfo/manuals/density/Chap–4.htm>>, downloaded from web on Jun. 22, 2004, 5 pgs.

Cubix, "What are Groups?", (© 2000) <<http://64.173.211.7/support/techinfo/system/density/info/groups.htm>>, downloaded from web on Jun. 22, 2004, 3 pgs.

Cubix, "SP 5200XS Series Plug–in Computers?", (© 2000) <<http://64.173.211.7/support/techinfo/bc/sp5200xs/intro.htm>>, downloaded from web on Jun. 22, 2004, 2 pgs.

Cubix, "SP 5200XS Series Technical Specifications", (© 2000) <<http://64.173.211.7/support/techinfo/bc/sp5200xs/spec.htm>>, downloaded from web on Jun. 22, 2004, 2 pgs.

Cubix, "SP 5200 Series" Chapter 1—Introduction, (© 2000) <<http://64.173.211.7/support/techinfo/manuals/sp5200/chap–1.htm>>, downloaded from web on Jun. 22, 2004, 3 pgs.

Cubix, "SP 5200 Series" Chapter 2—Switches & Jumpers, (© 2000) <<http://64.173.211.7/support/techinfo/manuals/sp5200/chap–2.htm>>, downloaded from web on Jun. 22, 2004, 3 pgs.

Cubix, "SP 5200 Series" Chapter 3—Installation, (© 2000) <<http://64.173.211.7/support/techinfo/manuals/sp5200/chap–3.htm>>, downloaded from web on Jun. 22, 2004, 4 pgs.

Cubix, "SP 5200 Series" Chapter 4—Technical Reference, (© 2000) <<http://64.173.211.7/support/techinfo/manuals/sp5200/chap–4.htm>>, downloaded from web on Jun. 22, 2004, 3 pgs.

Cubix, "DP 6200 'D' SeriesPlug–in Computers" <<http://64.173.211.7/support/techinfo/bc/dp/6200d/intro.htm>>, downloaded from web on Jun. 22, 2004, 3 pgs.

Cubix, "Installing DP or SP Series Boards" (© 2000) <<http://64.173.211.7/support/techinfo/bc/dp/6200d/intro.htm>>, downloaded from web on Jun. 22, 2004, 2 pgs.

Cubix, "Powering On/Off or Resetting Plug–In Computers in an Density System", (© 2000) <<http://64.173.211.7/support/techinfo/system/density/info/power.htm>>, downloaded from web on Jun. 22, 2004, 2 pgs.

Cubix, "Multiplexing Video, Keyboard & Mouse with Multiple Density System", (© 2000) <<http://64.173.211.7/support/techinfo/system/density/info/vkm–mux.htm>>, downloaded from web on Jun. 22, 2004, 2 pgs.

eBay Advertisement for "Total IT Group Network Engines", <<http://cgi.ebay.com/we/eBayISAPI.dll?Viewitem&item=5706388046&sspagename=STRK%3AMDBI%3AMEBI3AIT&rd=1>>, downloaded from web on Jun. 25, 2004, 1 pg.

"Features Chart", (Feb. 1, 1997) <<http://www.lantimes.com/testing/97feb/702b072a.html>>, downloaded from web on Jun. 23, 2004, 3 pgs.

Internet Telephone Roundup, "Industrial Computers", <<http://www.tmcnet.com/articles/itmag/0499/0499roundup.htm>>, downloaded from web on Jun. 23, 2004, 5 pgs.

Press Release: Hiawatha, Iowa, (Mar. 1, 1997) entitled "Crystal Group Products Offer Industrial PCs with Built–in Flexibility", <<http://www.crystalpc.com/news/pressreleases/prodpr.html>>, downloaded from web on May 14, 2004, 2 pgs.

Press Release: Kanata, Ontario, Canada, (Apr. 1998) entitled "Enhanced COTS SBC from DY 4 Systems features 166MHz Pentium™ Processor" <<http://www.realtime–info.be/VPR/layout/display/pr.asp?/pr.asp?PRID=363>>, 2 pgs.

Product Brochure entitled "SVME/DM–192 Pentium® II Single Board Computer" (Jun. 1999) pp. 1–9.

Product Brochure entitled "System 8000", <<http://www.bomara.com/Eversys/briefDefault.htm>>, downloaded from web on Jun. 22, 2004, 4 pgs.

Product Brochure entitled "ERS/FT II System", (© 2000) <<http://64.173.211.7/support/techinfo/system/ersft2/ersft2.htm>>, downloaded from web on Jun. 22, 2004, 4 pgs.

Product Manual entitled: "ERS II and ERS/FT II", Chap. 3, System Components, <<http://64.173.211.7/support/techinfo/manuals/ers2/ers2–c3.htm>>, downloaded from web on Jun. 22, 2004, 21 pgs.

Windows Magazine, "Cubix PowerSMP Series 4000", Nov. 1997, <http://<www.techweb.com/winmag/library/1997/1101/ntent008.htm>> downloaded from web on Jun. 22, 2004, p. NT07.

MPL, "The First Rugged All–in–One Industrial 486FDX–133 MHz PC", IPM486/IPM5 User Manual, 1998, pp. 1–24.

Agerwala, T., "SP2 System Architecture", IBM Systems Journal, vol. 34, No. 2, pp. 152–184 (1995).

"SQL Server and NT Cluster Manager Availability Demo," Microsoft Server Programmer Developers Conference, Nov. 1996, 15 pages total.

CETIA Brochure "CETIA Powerengine CVME 603e" pp. 1–6 downloaded from the internet at. http://www.cetia.com/ProductAddOns/wp–47–01.pdf on Feb. 15, 2006.

Eversys Corp., "Eversys System 8000 Consolidated Network Server Market and Product Overview," Slide Presentation, downloaded from <<http://eversys.com>>, 20 pages total.

Microsoft Cluster Service Center, "MSCS Basics," downloaded from <<http://www.nwnetworks.com/mscsbasics.htm>>, Feb. 7, 2005, 4 pages total.

MPL Brochure "1st Rugged All in One Industrial 486FDX–133 MHz PC" pp. 1–2, downloaded from the internet at. http://www.mpl.ch/DOCs/ds48600.pdf on Feb. 15, 2006.

MPL Brochure "IPM 486 Brochure/IPM5 User Manual" pp. 1–9 downloaded from the internet at http://www.mpl.ch/DOCs/u48600.pdf on Feb. 15, 2006.

Product Manual entitled: "ERS II and ERS/FT II", Chap. 6, Component Installation, <<http://64.173.211.7/support/techinfo/manuals/ers2/ers2–c6.htm>>, downloaded from web on Jun. 22, 2004, 18 pgs.

Snyder, J., "Better Management through consolidation" pp. 1–6 downloaded from the internet at http://www.opus1.com/www/jms/nw–con–0818rev.htm.

U.S. Appl. No. 12/322,858, filed Feb. 5, 2009, Chu, William W. Y.

Dirk S. Faegre et al., "CTOS Revealed", http://www.byte–.com/art/9412/sec13/art2.htm.

Jesse Berst's Anchor Desk, http://www.zdnet.com/anchordesk/talkback/talkback__56555.html.

Jesse Berst's Anchor Desk, http://www.zdnet.com/anchordesk/story/story__1504.html.

Kelly Spang, "Component House: Design Technology for PCs in a snap'—NeoSystmes Offers Building Blocks", Computer Reseller News, Apr. 21, 1997, Issue 732, Section: Channel Assembly, http://www.techweb.com/se/directlink.cgi?CRN19970421S0054.

MPL, "IPM 486 Brochure/IPM 5 User manual" 1998, pp. 1–52.

Rick Boyd–Merritt, "Ungradeable–PC effort takes divergent paths", http://techweb.cmp.com/eet/news/97/949news.effort.html.

"Think Modular", PC Magazine, Jun. 10, 1997, wysiwyg://60/http://homezdnet.com/pcmag/issues/1611/pcmg0072.htm.

Accton, "Gigabit Ethernet PCI Adater" (1999), 2 pp.

EIA–422A –Standard (Superseded), "Electrical Characteristics of Balanced Voltage Digital Interface Circuits" (Dec. 1978), 20 pp.

Hewlett–Packard, "Gigabit Ethernet Transceiver Chip, Preliminary Technical Data"HDMP–1636 Transceiver/HDMP–1646 Transceiver (May 1997), 16 pp.

Huq et al. "An Overview of LVDS Technology" National Semiconductor Corp. (Jul. 1998), 6 pp.

KTI Networks, "Installation Guide 10/100 Dual–speed Fast Ethernet PCI Adapters" (1999), 24 pp.

Micronet, "SP2500R Series Etherfast 10/100 MBPS Adapter, User's Guide" (1999), 10 pp.

MPL AG, "The First Rugged All–in–One Industrial 486FDX–133 MHz PC", IPM 486 Brochure/IPM5 User Manual (1998), 52 pp.

Network Engines, "P6000EXP Fault–Tolerant Load–Balanced Cluster Server", NEI00095 (1997), 4 pp.

PCI Local Bus, "PCI Local Bus Specification", Rev. 2.2 (Dec. 1998), 322 pp.

TIA/EIA "Standard Electrical Charateristics of Low Voltage Differential Signaling (LVDS) Interface Circuits", ANSI/TIA/EIA–644, (Mar. 1995), 42 pp.

White Cross Systems Limited, "Whitecross Data Exploration: Configuration and Maintenance Manual", (Jul. 2000), 699 pp.

Whitecross Systems, "WX/DES Hardware Maintenance", (2000), 284 pp.

Whitecross Systems, "WX/DES Technical Overview", (2000), 211 pp.

Ziatech Corporation, "Ketris 9000" Product Manual (2000), 159 pp.

Ziatech Corporation, "New STD 32® Fault Tolerant Computer Provides Modular Platform for "Non–Stop" Applications", Press Release (Feb. 1996), 2 pp.

Ziatech Corporation, "STD 32 Star System: Multiprocessing Computer System", Product Description (1998), 6 pp.

Ziatech Corporation, "System Designers Guide: Expanding STD Bus Performance Through Multiprocessing" (Apr. 1996), 6 pp.

Ziatech Corporation, "System Designer's Guide: Hot Swap Capability on STD 32 Computers" (Jan. 1996), 6 pp.

Ziatech Corporation, "Ziatech Industrial BIOS for Compact-PCI and STD 32 Systems" Software Manual For Industrial BIOS Version 4.7 (Jul. 1998), 134 pp.

Ziatech Corporation, "ZT 8907: Single Board computer with IntelDX4™ Microprocessor", Product Description (1998), 4 pp.

Ziatech Corporation, "ZT 8908: Single Board Computer with Pentium® Processor or AMD–K6™", Product Description (1998), 6 pp.

* cited by examiner

FIG. 1Φ

PASSWORD PROTECTED MODULAR COMPUTER METHOD AND DEVICE

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,321,335. These reissue applications are application Ser. No. 10/963,825 (the present application), application Ser. No. 11/474,256 filed Jun. 23, 2006 application Ser. No. 11/517,601 filed Sep. 6, 2006, application Ser. No. 12/322,858 filed Feb. 5, 2009, and application Ser. No. 12/577,074 filed Oct. 9, 2009, which are continuation applications for reissue of U.S. Pat. No. 6,321, 335.*

CROSS REFERENCE TO RELATED APPLICATIONS

The following two commonly-owned copending applications, including this one, are being filed concurrently and the other one is hereby incorporated by reference in their entirety for all purposes:

1. U.S. patent application Ser. No. 09/183,816, William W. Y. Chu, entitled, "Modular Computer Security Method and Device", and 2. U.S. patent application Ser. No. 09/183,493, William W. Y. Chu. entitled, "Password Protected Modular Computer Method and Device".

BACKGROUND OF THE INVENTION

The present invention relates to computing devices. More particularly, the present invention provides a method and device for securing a personal computer or set-top box using password protection techniques. Merely by way of example, the present invention is applied to a modular computing environment for desk top computers, but it will be recognized that the invention has a much wider range of applicability. It can be applied to a server as well as other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive such as memory in the giga-bit range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 20 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a curser on the display from one location to another location.

Other types of computing devices include portable computing devices such as "laptop" computers and the like. Although somewhat successful, laptop computers have many limitations. These computing devices have poor display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

*The portability of notebook computers is constrained by several factors. As a fully functional computer system, a notebook computer requires a substantial power supply. Batteries and AC adapters are both heavy limiting the ability to produce a device that is lightweight. A notebook computer also supplies primary input and display devices for the user. Usable keyboards and readable display screens limit the ability to produce a device with small dimensions that can support the software applications most commonly used on personal computers.*

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals the are duplicated in at least one of these computers. For example, both the desktop and portable computers typically include hard disk drives, floppy drives, CD-ROMs, computer memory, host processors, graphics accelerators, and the like. Because program software and "supporting programs generally must-be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use. The docking station typically includes a separate monitor, keyboard, mouse, and the like and is generally incompatible with other desktop PCs. The docking station is also generally not compatible with portable computers of other vendors. Another drawback to this approach is that the portable computer typically has lower performance and functionality than a conventional desktop PC. For example, the processor of the portable is typically much slower than processors in dedicated desktop computers, because of power consumption and heat dissipation concerns. As an example, it is noted that at the time of drafting of the present application, some top-of-the-line desktops include 400 MHz processors, whereas top-of-the-line notebook computers include 266 MHz processors.

Another drawback to the docking station approach is that the typical cost of portable computers with docking stations can approach the cost of having a separate portable computer and a separate desktop computer. Further, as noted above, because different vendors of portable computers have proprietary docking stations, computer users are held captive by their investments and must rely upon the particular computer vendor for future upgrades, support, and the like.

Thus what is needed are computer systems that provide reduced user investment in redundant computer components and provide a variable level of performance based upon computer configuration.

SUMMARY OF THE INVENTION

According to the present invention, a technique including a method and device for securing a computer module using a password in a computer system is provided. In an exemplary embodiment, the present invention provides a security system for an attached computer module ("ACM"). In an embodiment, the ACM inserts into a Computer Module Bay (CMB) within a peripheral console to form a functional computer.

In a specific embodiment, the present invention provides a computer module. The computer module has an enclosure that is insertable into a console. The module also has a central processing unit (i.e., integrated circuit chip) in the enclosure. The module has a hard disk drive in the enclosure, where the hard disk drive is coupled to the central processing unit. The module further has a programmable memory device in the enclosure, where the programmable memory device can be configurable to store a password for preventing a possibility of unauthorized use of the hard disk drive and/or other module elements. The stored password can be any suitable key strokes that a user can change from time to time. In a further embodiment, the present invention provides a permanent password or user identification code stored in flash memory, which also can be in the processing unit, or other integrated circuit element. The permanent password or user identification code is designed to provide a permanent "finger print" on the attached computer module.

In a specific embodiment, the present invention provides a variety of methods. In one embodiment, the present invention provides a method for operating a computer system such as a modular computer system and others. The method includes inserting an attached computer module ("ACM") into a bay of a modular computer system. The ACM has a microprocessor unit (e.g., microcontroller, microprocessor) coupled to a mass memory storage device (e.g., hard disk). The method also includes applying power to the computer system and the ACM to execute a security program, which is stored in the mass memory storage device. The method also includes prompting for a user password from a user on a display (e.g., flat panel, CRT). In a further embodiment, the present method includes a step of reading a permanent password or user identification code stored in flash memory, or other integrated circuit element. The permanent password or user identification code provides a permanent finger print on the attached computer module. The present invention includes a variety of these methods that can be implemented in computer codes, for example, as well as hardware.

Numerous benefits are achieved using the present invention over previously existing techniques. The present invention provides mechanical and electrical security systems to prevent theft or unauthorized use of the computer system in a specific embodiment. Additionally, the present invention substantially prevents accidental removal of the ACM from the console. In some embodiments, the present invention prevents illegal or unauthorized use during transit. The present invention is also implemented using conventional technologies that can be provided in the present computer system in an easy and efficient manner. Depending upon the embodiment, one or more of these benefits can be available. These and other advantages or benefits are described throughout the present specification and are described more particularly below.

These and other embodiments of the present invention, as well as its advantages and features, are described in more detail in conjunction with the text below and attached FIGS.

DESCRIPTION OF SPECIFIC EMBODIMENTS

I. System Hardware

Figure 1:
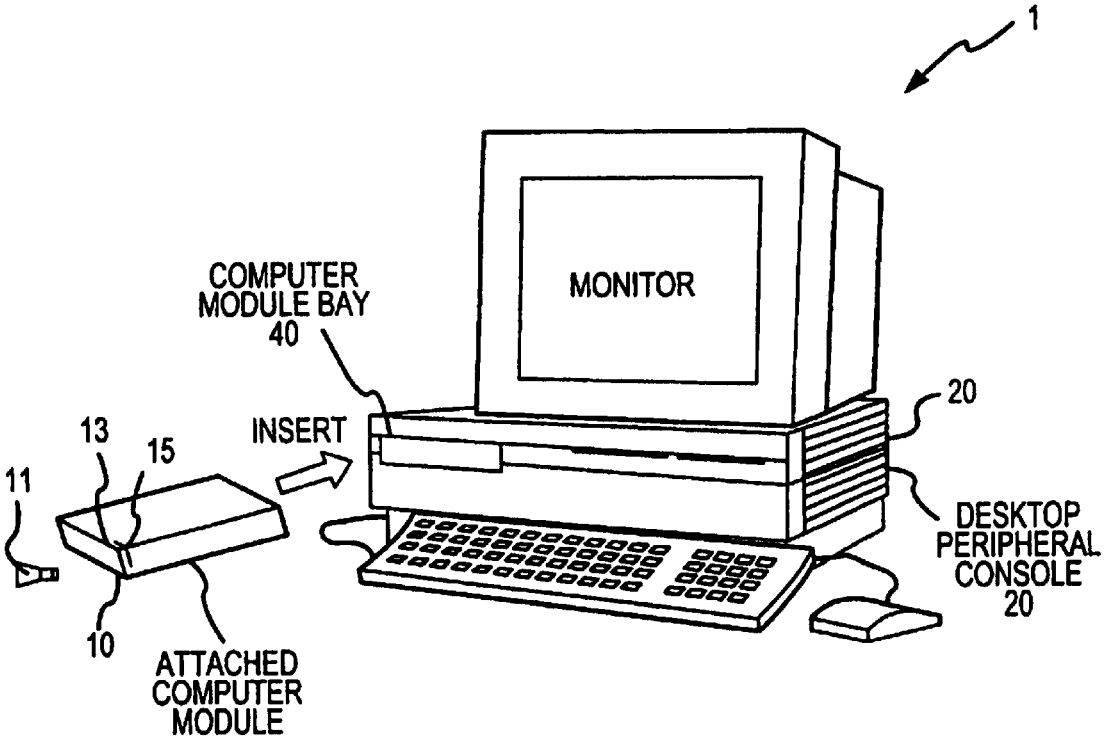
FIG. 1 is a simplified diagram of a computer system according to an embodiment of the present invention.

FIG. 1 is a simplified diagram of a computer system 1 according to an embodiment of the present invention. This diagram is merely an illustration and should not limit the scope of the claims herein. One of ordinary skill in the art would recognize other variations, modifications, and alternatives. The computer system 1 includes an attached computer module (i.e., ACM) 10, a desktop console 20, among other elements. The computer system is modular and has a variety of components that are removable. Some of these components (or modules) can be used in different computers, workstations, computerized television sets, and portable or laptop units.

In the present embodiment, ACM 10 includes computer components, as will be described below, including a central processing unit ("CPU"), IDE controller, hard disk drive, computer memory, and the like. The computer module bay (i.e., CMB) 40 is an opening or slot in the desktop console. The CMB houses the ACM and provides communication to and from the ACM. The CMB also provides mechanical protection and support to ACM 10. The CMB has a mechanical alignment mechanism for mating a portion of the ACM to the console. The CMB further has thermal heat dissipation sinks, electrical connection mechanisms, and the like. Some details of the ACM can be found in co-pending patent application Nos. 09/149,882 and 09/149,548 filed Sep. 8, 1998, commonly assigned, and hereby incorporated by reference for all purposes.

In a preferred embodiment, the present system has a security system, which includes a mechanical locking system, an electrical locking system, and others. The mechanical locking system includes at least a key 11. The key 11 mates with key hole 13 in a lock, which provides a mechanical latch 15 in a closed position. The mechanical latch, in the closed position, mates and interlocks the ACM to the computer module bay. The mechanical latch, which also has an open position, allows the ACM to be removed from the computer module bay. Further details of the mechanical locking system are shown in the Fig. below.

Figure 2:
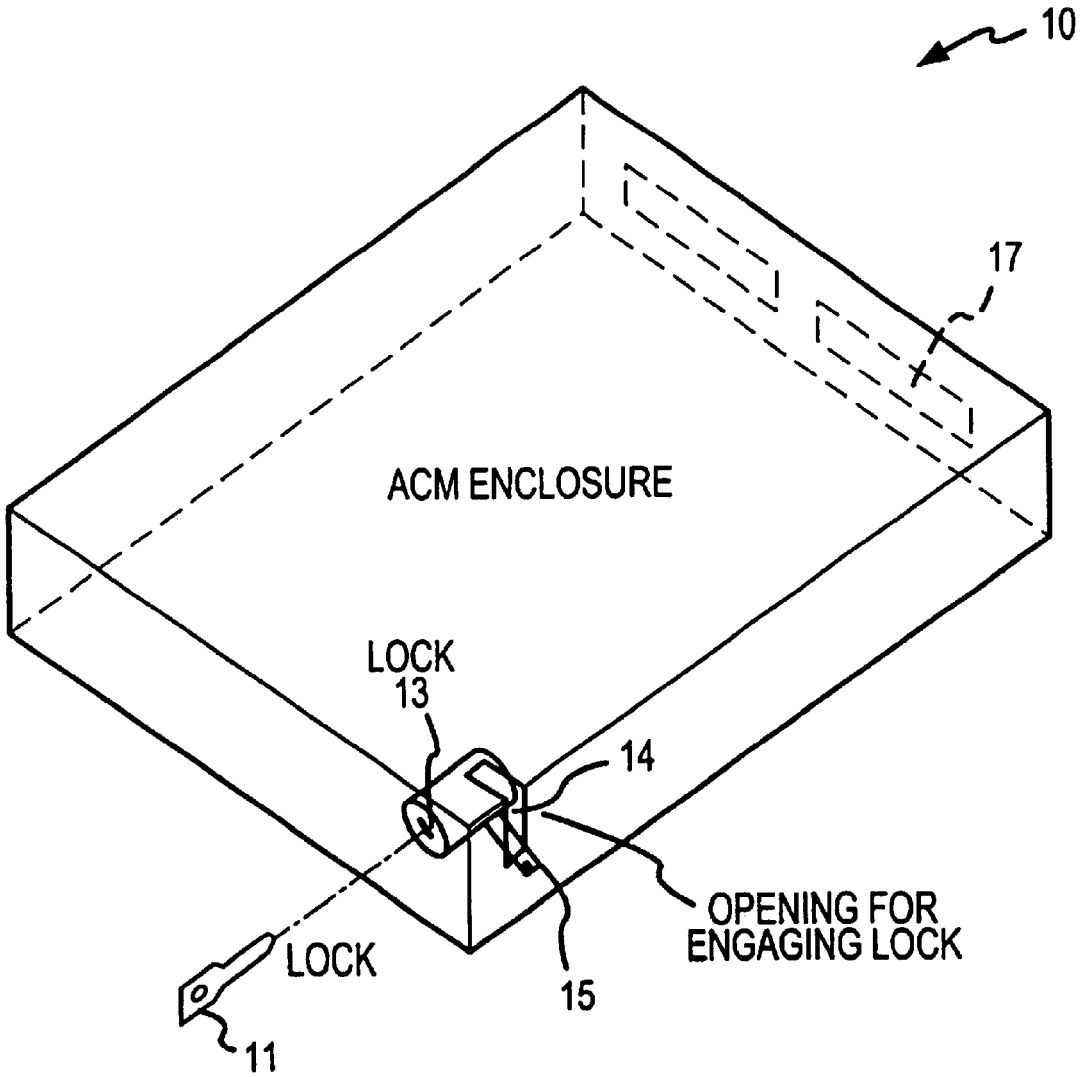
FIG. 2 is a simplified diagram of a computer module according to an embodiment of the present invention.

FIG. 2 is a simplified diagram of a computer module 10 according to an embodiment of the present invention. This diagram is merely an illustration and should not limit the scope of the claims herein. One of ordinary skill in the art would recognize other variations, modifications, and alternatives. Some of the reference numerals are similar to the previous Fig. for easy reading. The computer module 10 includes key 11, which is insertable into keyhole 13 of the lock. The lock has at least two position, including a latched or closed position and an unlatched or open position. The latched position secures the ACM to the computer module bay. The unlatched or open position allows the ACM to be inserted into or removed from the computer bay module. As shown, the ACM also has a slot or opening 14, which allows the latch to move into and out of the ACM. The ACM also has openings 17 in the backside for an electrical and/or mechanical connection to the computer module bay, which is connected to the console.

Figure 3:
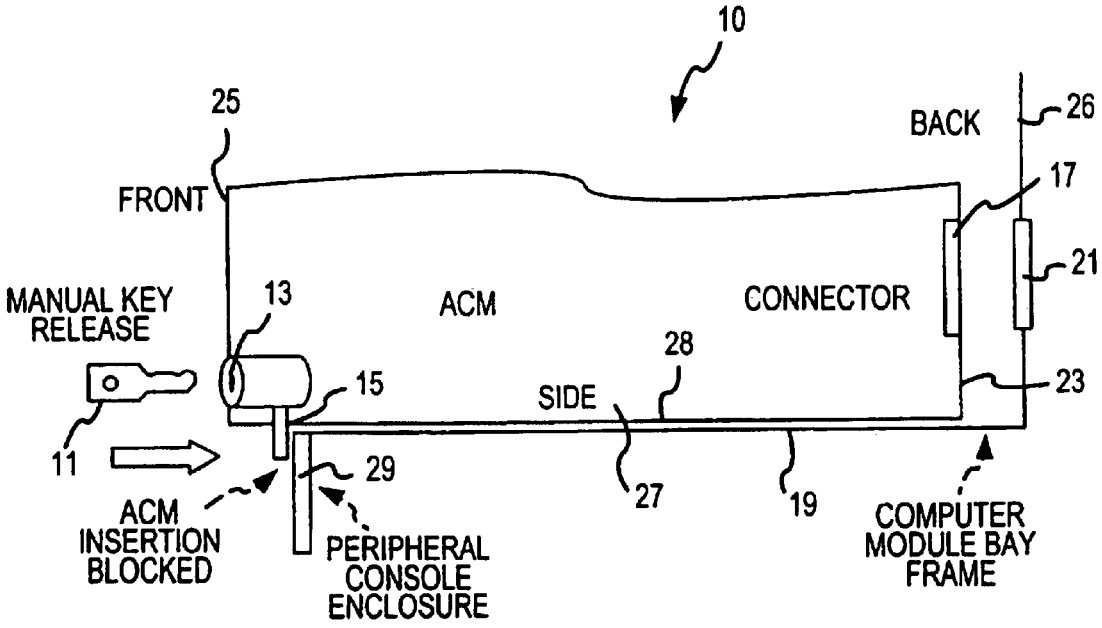
FIG. 3 is a simplified side-view diagram of a computer module according to an embodiment of the present invention.

FIG. 3 is a simplified side-view diagram of a computer module according to an embodiment of the present invention. This diagram is merely an illustration and should not limit the scope of the claims herein. One of ordinary skill in the art would recognize other variations, modifications, and alternatives. Some of the reference numerals are similar to the previous FIG. for easy reading. As shown, the ACM module inserts into the computer module bay frame 19, which is in the console. A side 27 and a bottom 19 of ACM slide and fit firmly into the computer module bay frame, which has at least a bottom portion 19 and back portion 26. A backside 23 of the ACM faces backside 26 of the frame. ACM also has a front-side or face 25 that houses the lock and exposes the keyhole 13 to a user. The key 11 is insertable from the face into the keyhole.

As the ACM inserts into the frame, connector 17 couples and inserts into connector 21. Connector 17 electrically and mechanically interface elements of the ACM to the console through connector 21. Latch 14 should be moved away from the bottom side 19 of the module bay frame before inserting the ACM into the frame. Once the ACM is inserted fully into the frame, latch 15 is placed in a closed or lock position, where it keeps the ACM firmly in place. That is, latch 15 biases against a backside portion 29 of the ACM enclosure to hold the ACM in place, where the connector 17 firmly engages, electrically and mechanically, with connector 21. To remove the ACM, latch 15 is moved away or opened from the back side portion of the ACM enclosure. ACM is manually pulled out of the computer module bay frame, where connector 17 disengages with connector 21. As shown, the key 11 is used to selectively move the latch in the open or locked position to secure the ACM into the frame module.

In most embodiments, the ACM includes an enclosure such as the one described with the following components, which should not be limiting:

1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present security system are described in more detail below.

Figure 4:
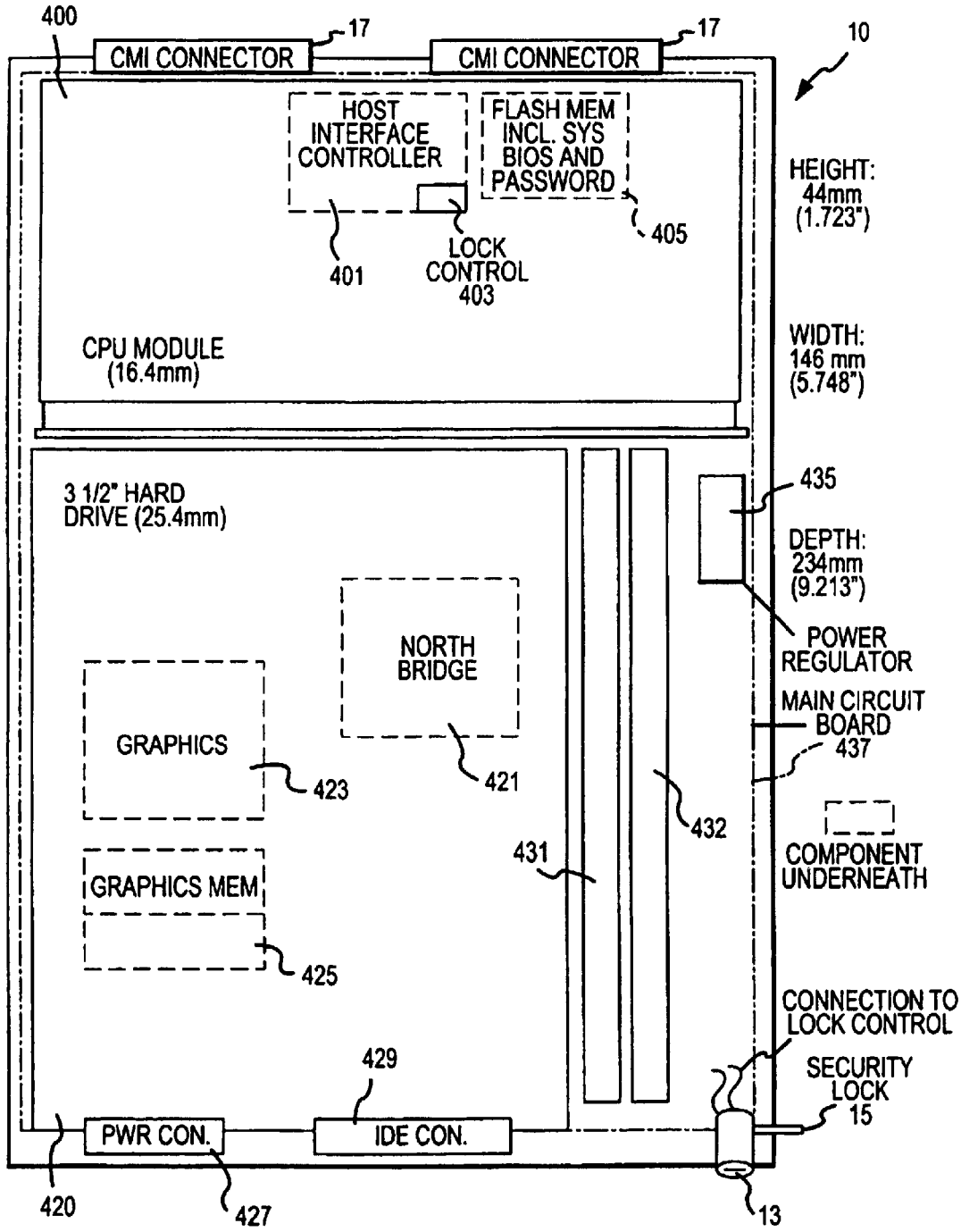
FIG. 4 is a simplified layout diagram of a security system for a computer system according to an embodiment of the present invention.

FIG. 4 is a simplified layout diagram of a security system for a computer system according to an embodiment of the present invention. This diagram is merely an illustration and should not limit the scope of the claims herein. One of ordinary skill in the art would recognize other variations, modifications, and alternatives. The layout diagram illustrates the top-view of the module 10, where the backside components (e.g.. Host Interface Controller) are depicted in dashed lines. The layout diagram has a first portion, which includes a central processing unit ("CPU") module 400, and a second portion, which includes a hard drive module 420. A common printed circuit board 437 houses these modules and the like. Among other features, the ACM includes the central processing unit module 400 with a cache memory 405, which is coupled to a north bridge unit 421, and a host interface controller 401. The host interface controller includes a lock control 403. As shown, the CPU module is disposed on a first portion of the attached computer module, and couples to connectors 17. Here, the CPU module is spatially located near connector 17.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, host interface controller 401 is coupled to BIOS/flash memory 405. Additionally, the host interface controller is coupled to a clock control logic, a configuration signal, and a peripheral bus. The present invention has a host interface controller that has lock control 403 to provide security features to the present ACM. Furthermore, the present invention uses a flash memory that includes codes to provide password protection or other electronic security methods.

The second portion of the attached computer module has the hard drive module 420. Among other elements, the hard drive module includes north bridge 421, graphics accelerator 423, graphics memory 425, a power controller 427, an IDE controller 429, and other components. Adjacent to and in parallel alignment with the hard drive module is a personal computer interface ("PCI") bus 431, 432. A power regulator 435 is disposed near the PCI bus.

In a specific embodiment, north bridge unit 421 often couples to a computer memory, to the graphics accelerator 423, to the IDE controller, and to the host interface controller via the PCI bus. Graphics accelerator 423 typically couples to a graphics memory 423, and other elements. IDE controller 429 generally supports and provides timing signals necessary for the IDE bus. In the present embodiment, the IDE controller is embodied as a 643U2 PCI-to IDE chip from CMD Technology, for example. Other types of buses than IDE are contemplated, for example EIDE, SCSI, 1394, and the like in alternative embodiments of the present invention.

The hard drive module or mass storage unit 420 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 420 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE. Among other features, the computer system includes an ACM with security protection. The ACM connects to the console, which has at least the following elements, which should not be limiting.

1) Connection to input devices, e.g. keyboard or mouse;
2) Connection to display devices, e.g. Monitor;
3) Add-on means, e.g. PCI add-on slots;
4) Removable storage media subsystem, e.g. Floppy drive, CDROM drive;
5) Communication device, e.g. LAN or modem;
6) An interface device and connectors to ACM;
7) A computer module bay with a notch in the frame for ACM's lock; and
8) Power supply and other accessories.

As noted, the computer module bay is an opening in a peripheral console that receives the ACM. The computer module bay provides mechanical support and protection to ACM. The module bay also includes, among other elements, a variety of thermal components for heat dissipation, a frame that provides connector alignment, and a lock engagement, which secures the ACM to the console. The bay also has a printed circuit board to mount and mate the connector from the ACM to the console. The connector provides an interface between the ACM and other accessories.

Figure 5:
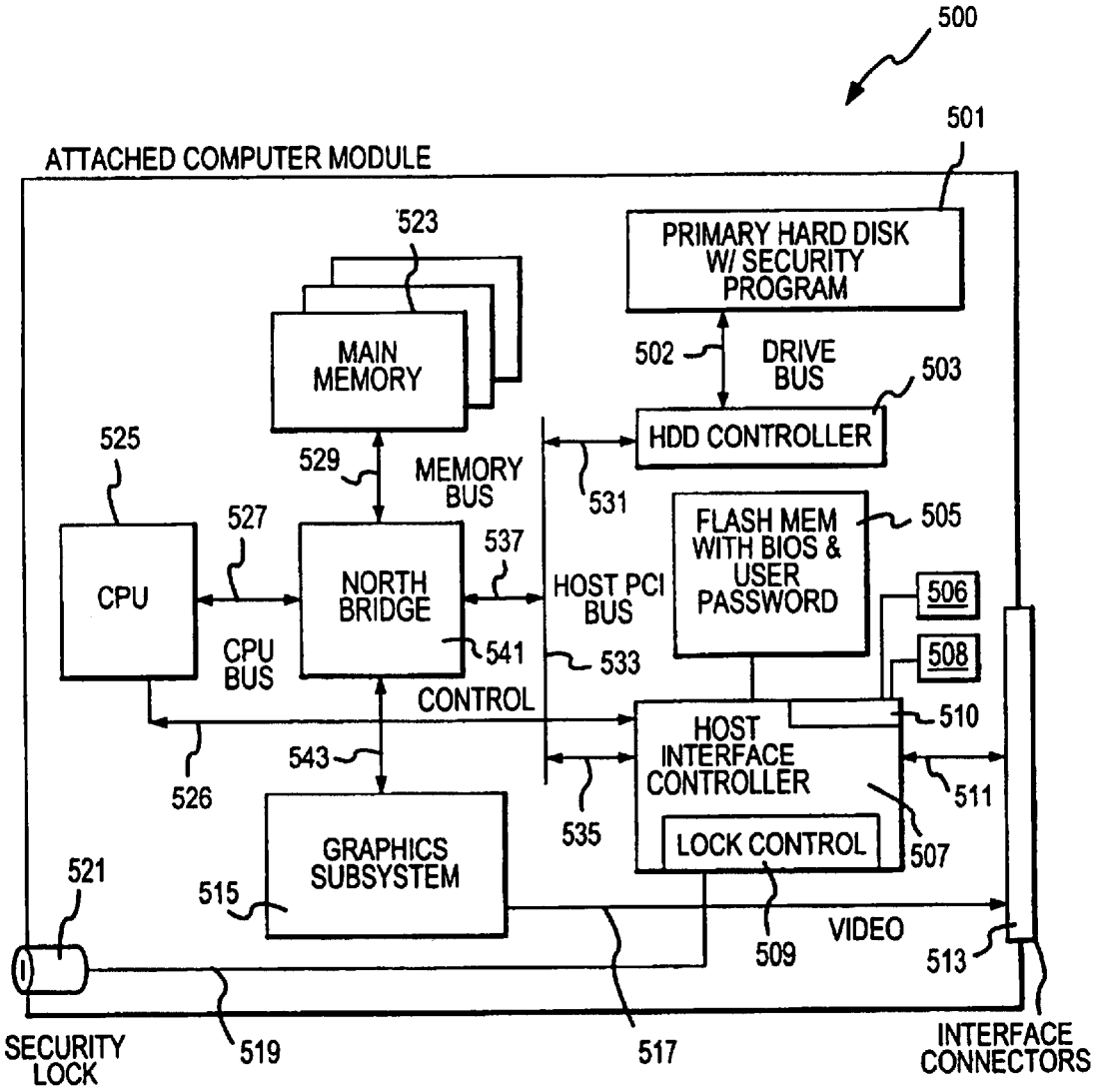
FIG. 5 is a simplified block diagram of a security system for a computer module according to an embodiment of the present invention.

FIG. 5 is a simplified block diagram 500 of a security system for a computer module according to an embodiment of the present invention. This diagram is merely an illustration and should not limit the scope of the claims herein. One of ordinary skill in the art would recognize other variations, modifications, and alternatives. The block diagram 500 has a variety of features such as those noted above, as well as others. In the present diagram, different reference numerals are used to show the operation of the present system.

The block diagram is an attached computer module 500. The module 500 has a central processing unit, which communicates to a north bridge 541, by way of a CPU bus 527. The north bridge couples to main memory 523 via memory bus 529. The main memory can be any suitable high speed memory device or devices such as dynamic random access memory ("DRAM") integrated circuits and others. The DRAM includes at least 32 Meg. or 64 Meg. and greater of memory, but can also be less depending upon the application. Alternatively, the main memory can be coupled directly with the CPU in some embodiments. The north bridge also couples to a graphics subsystem 515 via bus [542] *543*. The graphics subsystem can include a graphics accelerator, graphics memory, and other devices. Graphics subsystem transmits a video signal *519* to an interface connector, which couples to a display, for example.

The attached computer module also includes a primary hard disk drive that serves as a main memory unit for programs and the like. The hard disk can be any suitable drive that has at least 2 GB and greater. As merely an example, the hard disk is a Marathon 2250 (2.25 GB, 2 ½ inch drive) product made by Seagate Corporation of Scotts Valley, but can be others. The hard disk communicates to the north bridge by way of a hard disk drive controller and bus lines 502 and 531. The hard disk drive controller couples to the north bridge by way of the host PCI bus, which connects bus 537 to the north bridge. The hard disk includes computer codes that implement a security program according to the present invention. Details of the security program are provided below.

The attached computer module also has a flash memory device 505 with a BIOS. The flash memory device 505 also has codes for a user password that can be stored in the device. The flash memory device generally permits the storage of such password without a substantial use of power, even when disconnected. As merely an example, the flash memory device has at least 4 Meg. or greater of memory, or 16 Meg. or greater of memory. A host interface controller 507 communications to the north bridge via bus 535 and host PCI bus. The host interface controller also has a lock control 509, which couples to a lock. The lock is attached to the module and has a manual override to the lock on the host interface controller in some embodiments. Host interface controller 507 communicates to the console using bus 511, which couples to [connection] *connector* 513.

Figure 5A:
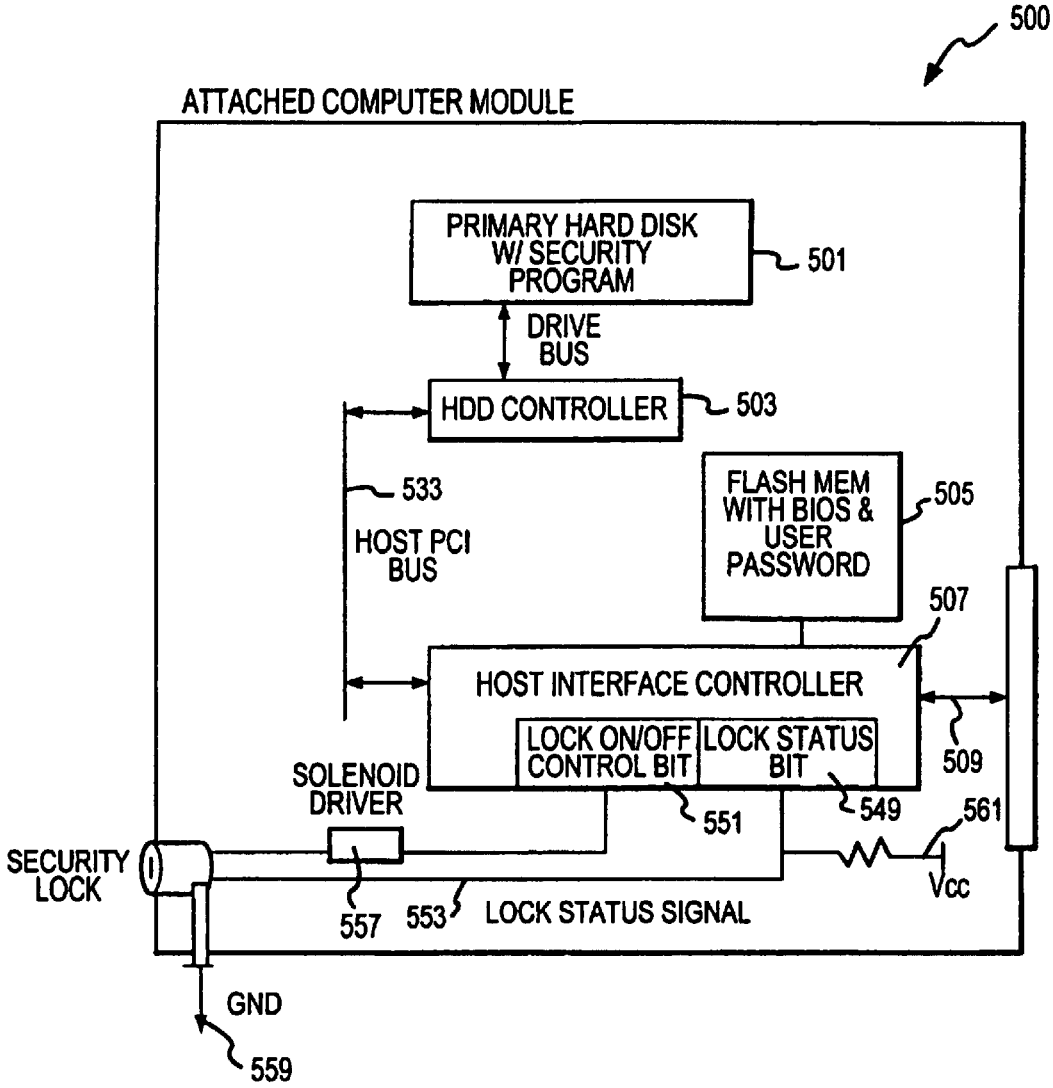

In one aspect of the present invention the security system uses a combination of electrical and mechanical locking mechanisms. Referring to FIG. 5A, for example, the present system provides a lock status mechanism in the host interface controller 509. The lock status of the lock is determined by checking a lock status bit 549, which is in the host interface controller. The lock status bit is determined by a signal 553, which is dependent upon the position of the lock. Here, the position of the lock is closed in the ground 559 position, where the latch couples to a ground plane in the module and/or system. Alternatively, the signal of the lock is at Vcc, for example, which is open. Alternatively, the signal can be ground in the open position and Vcc in the closed position, depending upon the application. Other signal schemes can also be used depending upon the application.

Once the status is determined, the host interface controller turns the lock via solenoid 557 in a lock on or lock off position, which is provided through the control bit 551, for example. The control bit is in a register of the host interface controller in the present example. By way of the signal schemes noted and the control bit, it is possible to place the lock in the lock or unlock position in an electronic manner. Once the status of the lock is determined, the host interface controller can either lock or unlock the latch on the module using a variety of prompts, for example.

In a preferred embodiment, the present invention uses a password protection scheme to electronically prevent unauthorized access to the computer module. The present password protection scheme uses a combination of software, which is a portion of the security program, and a user password, which can be stored in the flash memory device 505. By way of the flash memory device, the password does not become erased by way of power failure or the lock. The password is substantially fixed in code, which cannot be easily erased. Should the user desire to change the password, it can readily be changed by erasing the code, which is stored in flash memory and a new code (i.e., password) is written into the flash memory. An example of a flash memory device can include a Intel Flash 28F800F3 series flash, which is available in 8 Mbit and 16 Mbit designs. Other types of flash devices can also be used, however. Details of a password protection method are further explained below by way of the FIGS.

In a specific embodiment, the present invention also includes a real-time clock 510 in the ACM, but is not limited. The real-time clock can be implemented using a reference oscillator 14.31818 MHz 508 that couples to a real-time clock circuit. The real-time clock circuit can be in the host interface controller. An energy source 506 such as a battery can be used to keep the real-time clock circuit running even when the ACM has been removed from the console. The real-time clock can be used by a security program to perform a variety of functions. As merely an example, these functions include: (1) fixed time period in which the ACM can be used, e.g., ACM cannot be used at night; (2) programmed ACM to be used after certain date, e.g., high security procedure during owner's vacation or non use period; (3) other uses similar to a programmable time lock. Further details of the present real-time clock are described in the application listed under Ser. No. 09/183,816 noted above.

In still a further embodiment, the present invention also includes a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present password and user identification can be quite important for electronic commerce applications and the like. In one or more embodiments, the permanent password or user code can be combined with the password on flash memory for the security program, which is described below in more detail.

II. Security Protection Programs

Figure 6:
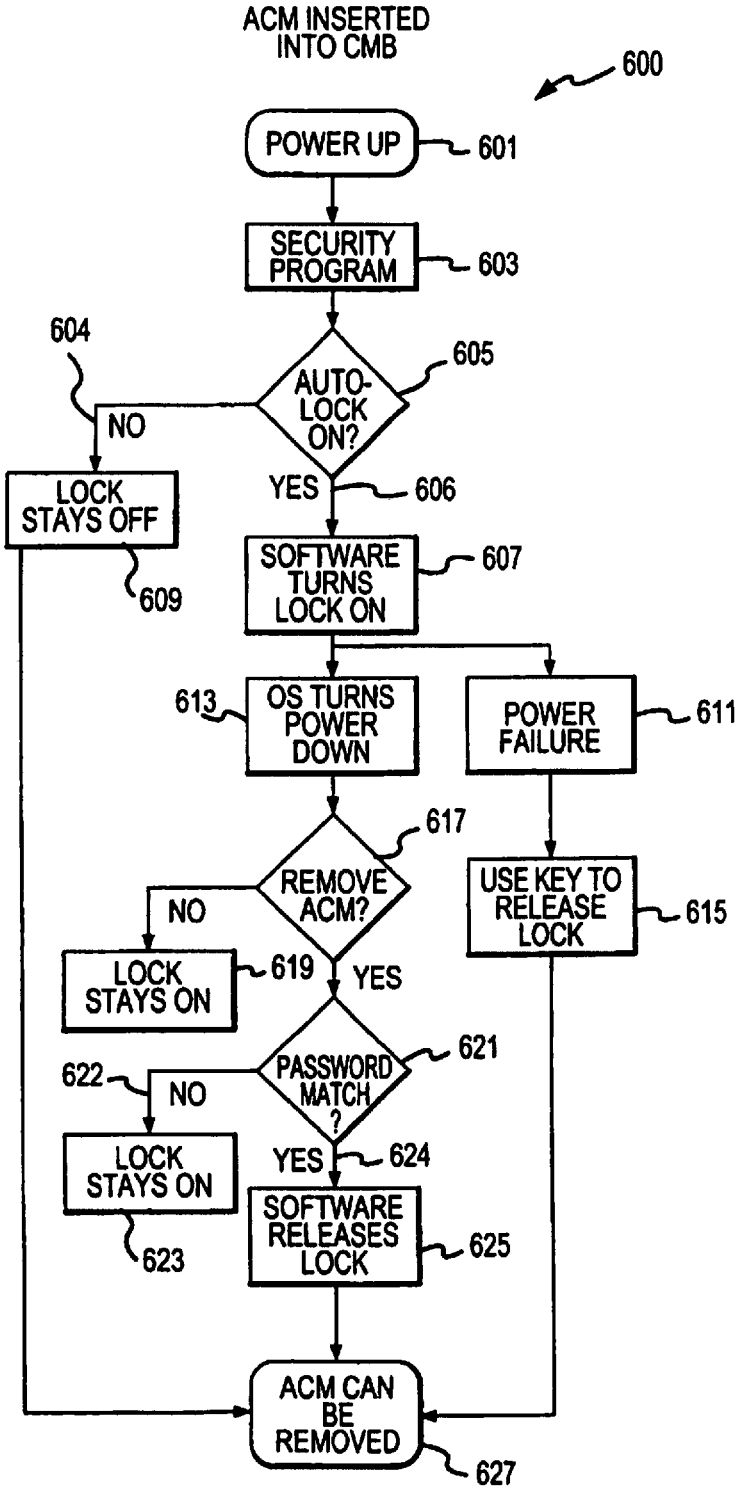
FIGS. 6 and 7 show simplified flow diagrams of security methods according to embodiments of the present invention.
Figure 7:
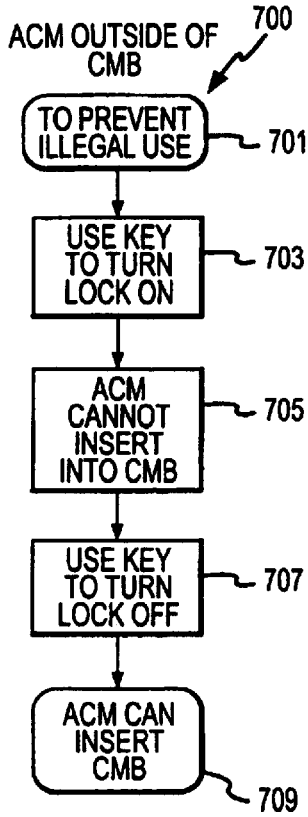

FIGS. 6 and 7 show simplified flow diagrams 600, 700 of security methods according to embodiments of the present invention. These diagrams are merely illustrations and should not limit the scope of the claims herein. One of ordinary skill in the art would recognize other variations, modifications, and alternatives. Referring to FIG. 6, which considers an example for when the ACM is inserted into the computer module bay in the console, ACM has already been inserted into the console and is firmly engaged in an electrical and mechanical manner. A computer system is powered up 601, which provides selected signals to the microprocessor. The microprocessor oversees the operation of the computer system. The microprocessor searches the memory in, for example, the hard disk drive and execute a security program, step 603.

The security program runs through a sequence of steps before allowing a user to operate the present system with the ACM. Among other processes, the security program determines if an "Auto-lock" is ON. If so, the security program goes via branch 606 to step 607. Alternatively, the security program goes to step 609, which determines that the lock stays OFF and loops to step 627, which indicates that the ACM can be removed physically from the console. In step 607, the security program turns a switch or switching means that turns ON a lock, which can be electrical, mechanical, or a combination of electrical and mechanical.

In a specific embodiment, the security program turns OFF the power of the ACM and Console. Here, the security program directs the OS to turn the power OFF, step 613. In an embodiment where power failure occurs (step 611), a key is used to release a latch in the ACM on the lock 615, where the ACM can be removed, step 627. From step 613, the security program determines if the ACM is to be removed, step 617. If not, the lock stays ON, step 619. Alternatively, the security detection program determines if the password (or other security code) matches with the designated password, step 621. If not, the lock stays ON, step 623. Alternatively, the security program releases the lock 625, which frees the ACM. Next, the ACM can be removed, step 627.

In an alternative embodiment, the present invention provides a security system for the ACM, which is outside the console or computer module bay. See, FIG. 7, for example. As shown, the security system is implemented to prevent illegal or unauthorized use (step 701) of the ACM, which has not been used in the console. Here, a key turns ON a lock (step 703). The lock moves a latch in the ACM to a specific spatial location that physically blocks the passage of the ACM into the computer module bay. Accordingly, the ACM cannot insert (step 705) into the computer module bay.

In an alternative aspect, the key can be used to turn the lock OFF, step 707. Here, the key moves the latch in a selected spatial location that allows the ACM to be inserted into the computer bay module. In the OFF position, the ACM inserts into the computer module bay, step 709. Once the ACM is in the bay, a user can begin operating the ACM through the console. In one embodiment, the computer console including the ACM goes through the sequence of steps in the above FIG., but is not limited.

In a specific embodiment, the present invention implements the sequences above using computer software. In other aspects, computer hardware can also be used and is preferably in some applications. The computer hardware can include a mechanical lock, which is built into the ACM. An example of such mechanical lock is shown above, but can also be others. In other aspects, the lock can be controlled or accessed electronically by way of computer software. Here, the key can be used to as a manual override if the ACM or computer fails.

The lock is used to prevent theft and accidental removal inside CMB. The current invention locates the lock inside the ACM to allow a user to keep a single key as ACM is moved from console to console at different locations. When ACM is in transit, the lock can be engaged using the key so that the latch extends outside ACM's enclosure. The extended latch prevents ACM from being inserted into any CMB. This prevents any illegal use of ACM by someone other than the user.

In one aspect of the invention, the user password is programmable. The password can be programmable by way of the security program. The password can be stored in a flash memory device within the ACM. Accordingly, the user of the ACM and the console would need to have the user password in order to access the ACM. In the present aspect, the combination of a security program and user password can provide the user a wide variety of security functions as follows:

1) Auto-lock capability when ACM is inserted into CMB;

2) Access privilege of program and data;

3) Password matching for ACM removal; and

4) Automatic HDD lock out if tempering is detected.

In still a further embodiment, the present invention also includes a method for reading a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present method allows a third party confirm the user by way of the permanent password or user code. The present password and user identification can be quite important for electronic commerce applications and the like, which verify the user code or password. In one or more embodiments, the permanent password or user code can be combined with the password on flash memory for the security program.

*Embodiments in accordance with the present invention may interface two PCI or PCI-like buses using a non-PCI or non-PCI-like channel. In accordance with embodiments of the present invention, PCI control signals are encoded into control bits and the control bits, rather than the control signals that they represent, are transmitted on the interface channel. At the receiving end, the control bits representing control signals are decoded back into PCI control signals prior to being transmitted to the intended PCI bus.*

*The fact that control bits rather than control signals are transmitted on the interface channel allows using a smaller number of signal channels and a correspondingly small number of conductive lines in the interface channel than would otherwise be possible. This is because the control bits can be more easily multiplexed at one end of the interface channel and recovered at the other end than control signals. This relatively small number of signal channels used in the interface channel allows using LVDS channels for the interface. As mentioned above, an LVDS channel is more cable friendly, faster, consumes less power, and generates less noise than a PCI bus channel, which is used in the prior art to interface two PCI buses. Therefore, the present invention advantageously uses an LVDS channel for the hereto unused purpose of interfacing PCI or PCI-like buses. The relatively smaller number of signal channels in the interface also allows using connectors having smaller pins counts. As mentioned above an interface having a smaller number of signal channels and, therefore, a smaller number of conductive lines is less bulky and less expensive than one having a larger number of signal channels. Similarly, connectors having a smaller number of pins are also less expensive and less bulky than connectors having a larger number of pins.*

*In a preferred embodiment, the interface channel has a plurality of serial bit channels numbering fewer than the number of parallel bus lines in each of the PCI buses and operates at a clock speed higher than the clock speed at which any of the bus lines operates. More specifically, the interface channel includes two sets of unidirectional serial bit channels which transmit data in opposite directions such that one set of bit channels transmits serial bits from the HIC to the PIC while the other set transmits serial bits from the PIC to the HIC. For each cycle of the PCI clock, each bit channel of the interface channel transmits a packet of serial bits.*

Figure 8:
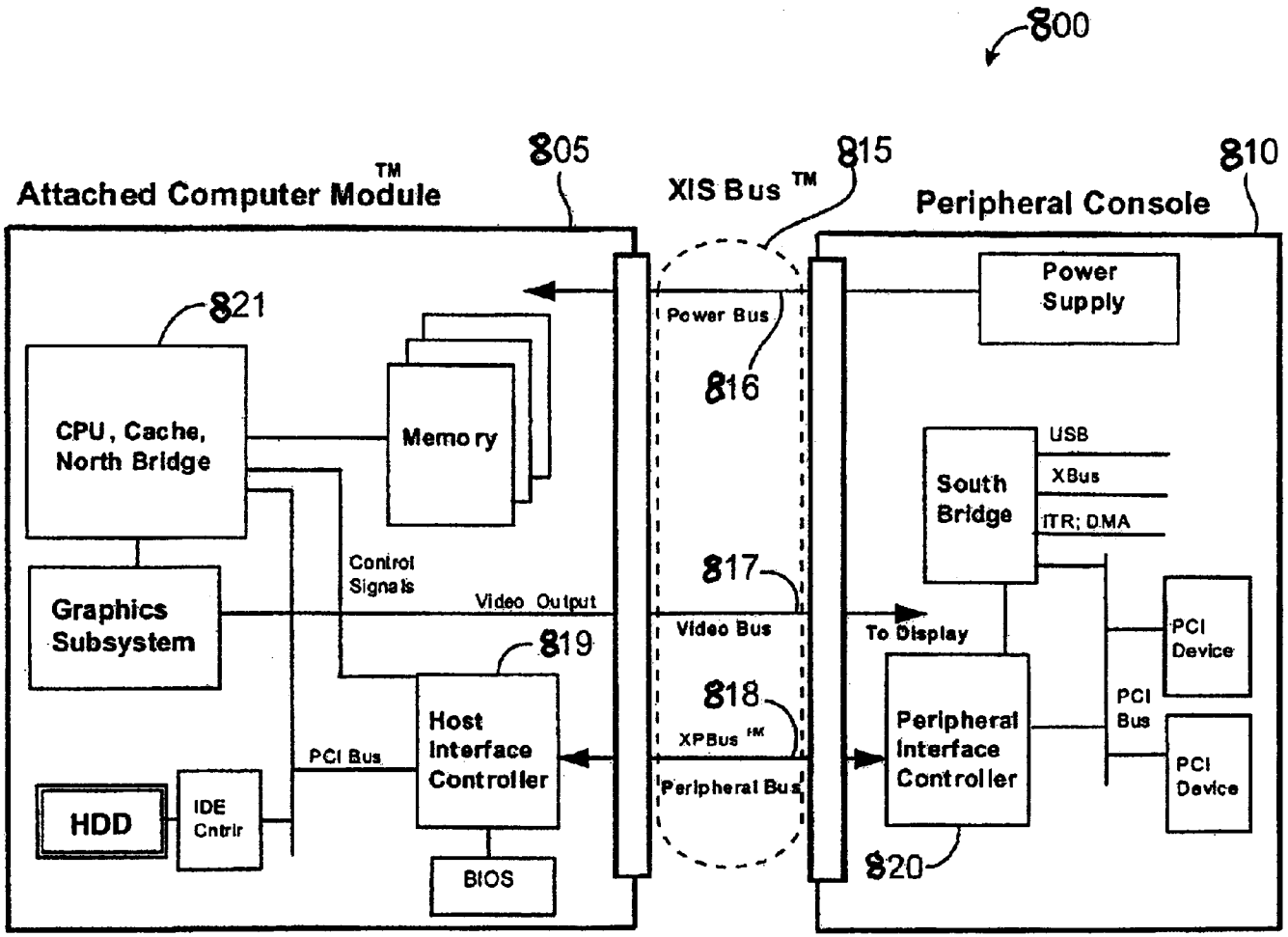
*FIG. 8 is a block diagram of one embodiment of a computer system using the interface of the present invention.*

*FIG. 8 is a block diagram of one embodiment of a computer system 800 using the interface of the present invention. Computer system 800 includes an attached computer module (ACM) 805 and a peripheral console 810. The ACM 805 and the peripheral console 810 are interfaced through an exchange interface system (XIS) bus 815. The XIS bus 815 includes power bus 816, video bus 817 and peripheral bus (XPBus) 818, which is also herein referred to as an interface channel. The power bus 816 transmits power between ACM 805 and peripheral console 810. In a preferred embodiment power bus 816 transmits power at voltage levels of 3.3 volts, 5 volts and 12 volts. Video bus 817 transmits video signals between the ACM 805 and the peripheral console 810. In a preferred embodiment, the video bus 817 transmits analog Red Green Blue (RGB) video signals for color monitors, digital video signals (such as Video Electronics Standards Association (VESA) Plug and Display's Transition Minimized Differential Signaling (TMDS) signals for flat panel displays), and television (TV) and/or super video (S-video) signals. The XPBus 818 is coupled to host interface controller (HIC) 819 and to peripheral interface controller (PIC) 820, which is also sometimes referred to as a bay interface controller.*

Figure 9:
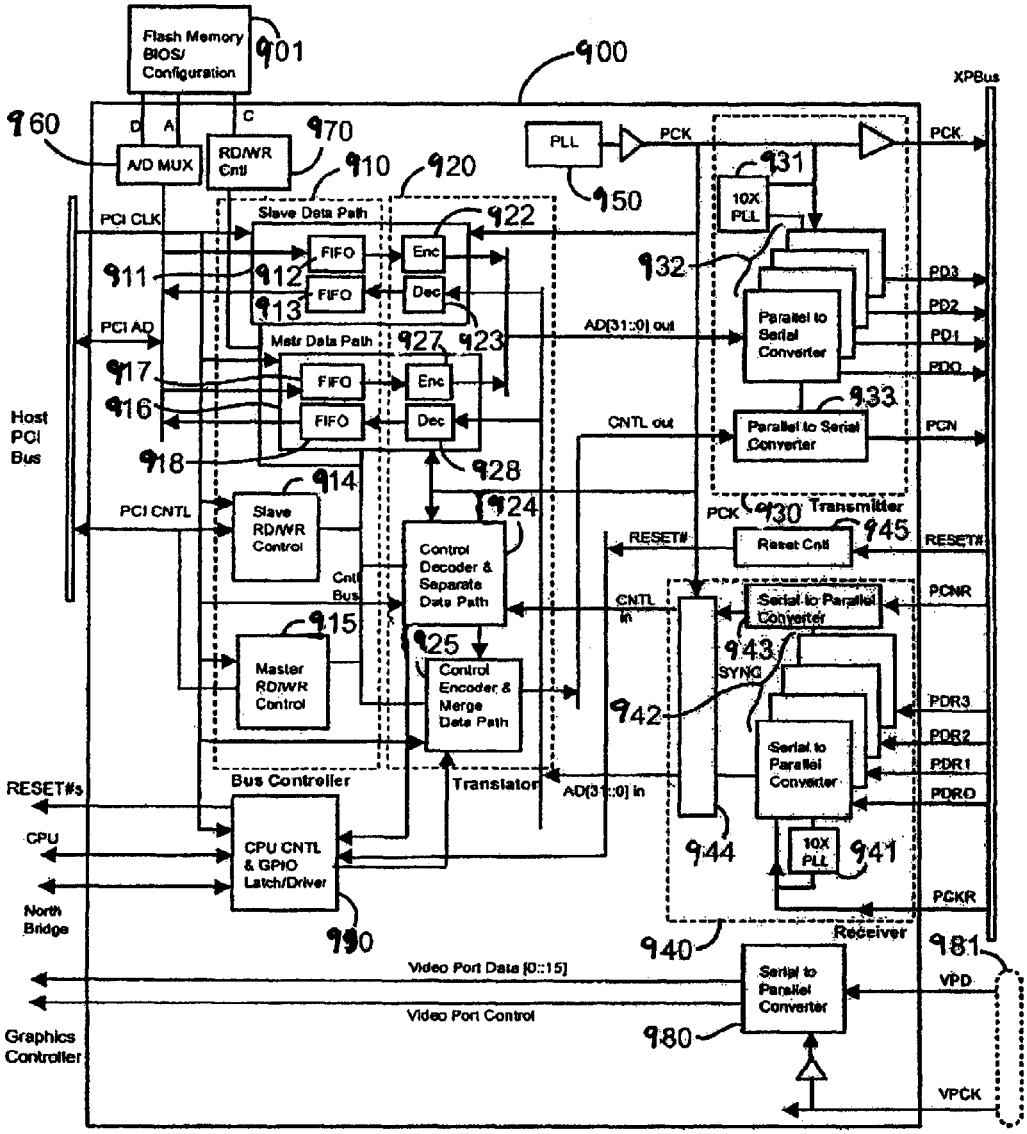
*FIG. 9 is a detailed block diagram of one embodiment of the host interface controller (HIC) of the present invention.*

*FIG. 9 is a detailed block diagram of one embodiment of the host interface controller (HIC) of the present invention. As shown in FIG. 9, HIC 900 comprises bus controller 910, translator 920, transmitter 930, receiver 940, a PLL 950, an address/data multiplexer (A/D MUX) 960, a read/write controller (RD/WR Cntl) 970, a video serial to parallel converter 980 and a CPU control & general purpose input/output latch/driver (CPU CNTL & GPIO latch/driver) 990.*

*HIC 900 is coupled to an optional flash memory BIOS configuration unit 901. Flash memory unit 901 stores basic input output system (BIOS) and PCI configuration information and supplies the BIOS and PCI configuration information to A/D MUX 960 and RD/WR Control 970, which control the programming, read, and write of flash memory unit 901.*

*Bus controller 910 is coupled to the host PCI bus, which is also referred to herein as the primary PCI bus, and manages PCI bus transactions on the host PCI bus. Bus controller 910 includes a slave (target) unit 911 and a master unit 916.*

*Both slave unit 911 and master unit 916 each include two first in first out (FIFO) buffers, which are preferably asynchronous with respect to each other since the input and output of the two FIFOs in the master unit 916 as well as the two FIFOs in the slave unit 911 are clocked by different clocks, namely the PCI clock and the PCK. Additionally, slave unit 911 includes encoder 922 and decoder 923, while master unit 916 includes encoder 927 and decoder 928. The FIFOs 912, 913, 917 and 918 manage data transfers between the host PCI bus and the XPBus, which in the embodiment shown in FIG. 9 operate at 33 MHz and 66 MHz, respectively. PCI address/data (AD) from the host PCI bus is entered into FIFOs 912 and 917 before they are encoded by encoders 922 and 923. Encoders 922 and 923 format the PCI address/data bits to a form more suitable for parallel to serial conversion prior to transmittal on the XPBus. Similarly, address and data information from the receivers is decoded by decoders 923 and 928 to a form more suitable for transmission on the host PCI bus. Thereafter the decoded data and address information is passed through FIFOs 913 and 918 prior to being transferred to the host PCI bus. FIFOs 912, 913, 917 and 918, allow bus controller 910 to handle posted and delayed PCI transactions and to provide deep buffering to store PCI transactions.*

*Bus controller 910 also comprises slave read/write control (RD/WR Cntl) 914 and master read/write control (RD/WR Cntl) 915. RD/WR controls 914 and 915 are involved in the transfer of PCI control signals between bus controller 910 and the host PCI bus.*

*Bus controller 910 is coupled to translator 920. Translator 1220 comprises encoders 922 and 927, decoders 923 and 928, control decoder & separate data path unit 924 and control encoder & merge data path unit 925. As discussed above encoders 922 and 927 are part of slave data unit 911 and master data unit 916, respectively, receive PCI address and data information from FIFOs 912 and 917, respectively, and encode the PCI address and data information into a form more suitable for parallel to serial conversion prior to transmittal on the XPBus. Similarly, decoders 923 and 928 are part of slave data unit 911 and master data unit 916, respectively, and format address and data information from receiver 940 into a form more suitable for transmission on the host PCI bus. Control encoder & merge data path unit 925 receives PCI control signals from the slave RD/WR control 914 and master RD/WR control 915. Additionally, control encoder & merge data path unit 925 receives control signals from CPU CNTL & GPIO latch/driver 990, which is coupled to the CPU and north bridge (not shown in FIG. 9). Control encoder & merge data path unit 925 encodes PCI control signals as well as CPU control signals and north bridge signals into control bits, merges these encoded control bits and transmits the merged control bits to transmitter 930, which then transmits the control bits on the data lines PD0 to PD3 and control line PCN of the XPBus. Examples of control signals include PCI control signals and CPU control signals. A specific example of a control signal is FRAME# used in PCI buses. A control bit, on the other hand is a data bit that represents a control signal. Control decoder & separate data path unit 924 receives control bits from receiver 940 which receives control bits on data lines PDR0 to PDR3 and control line PCNR of the XPBus. Control decoder & separate data path unit 924 separates the control bits it receives from receiver 940 into PCI control signals, CPU control signals and north bridge signals, and decodes the control bits into PCI control signals, CPU control signals, and north bridge signals all of which meet the relevant timing constraints.*

*Transmitter 930 receives multiplexed parallel address/data (A/D) bits and control bits from translator 920 on the AD[31::0] out and the CNTL out lines, respectively. Transmitter 930 also receives a clock signal from PLL 950. PLL 950 takes a reference input clock and generates PCK that drives the XPBus. PCK is asynchronous with the PCI clock signal and operates at 66 MHz, twice the speed of the PCI clock of 33 MHz. The higher speed is intended to accommodate at least some possible increases in the operating speed of future PCI buses. As a result of the higher speed, the XPBus may be used to interface two PCI or PCI-like buses operating at 66 MHz rather than 33 MHz or having 64 rather than 32 multiplexed address/data lines.*

*The multiplexed parallel A/D bits and some control bits input to transmitter 930 are serialized by parallel to serial converters 932 of transmitter 930 into 10 bit packets. These bit packets are then output on data lines PD0 to PD3 of the XPBus. Other control bits are serialized by parallel to serial converter 933 into 10 bit packets and send out on control line PCN of the XPBus.*

*The XPBus lines, PD0 to PD3, PCN, PDR0 to PDR3 and PCNR, and the video data and clock lines, VPD and VPCK, are not limited to being LVDS lines, as they may be other forms of bit based lines. For example, in another embodiment, the XPBus lines may be IEEE 1394 lines.*

*It is to be noted that although each of the lines PCK, PD0 to PD3, PCN, PCKR, PDR0 to PDR3, PCNR, VPCK, and VPD is referred to as a line, in the singular rather than plural, each such line may contain more than one physical line. For example, in the embodiment shown in FIG. 11, each of lines PCK, PD0 to PD3 and PCN includes two physical lines between each driver and its corresponding receiver. The term line, when not directly preceded by the terms physical or conductive, is herein used interchangeably with a signal or bit channel which may consist of one or more physical lines for transmitting a signal. In the case of non-differential signal lines, generally only one physical lines is used to transmit one signal. However, in the case of differential signal lines, a pair of physical lines is used to transmit one signal. For example, a bit line or bit channel in an LVDS or IEEE 1394 interface consists of a pair of physical lines which together transmit a signal.*

*A bit based line (i.e., a bit line) is a line for transmitting serial bits. Bit based lines typically transmit bit packets and use a serial data packet protocol. Examples of bit lines include an LVDS line, an IEEE 1394 line, and a Universal Serial Bus (USB) line.*

*It is to be noted that although each of the lines PCK, PD0 to PD3, PCN, PCKR, PDR0 to PDR3, PCNR, VPCK, and VPD is referred to as a line, in the singular rather than plural, each such line may contain more than one physical line. For example, in the embodiment of FIG. 14, each of lines PCK, PD0 to PD3 and PCN includes two physical lines between each driver and its corresponding receiver. The term line, when not directly preceded by the terms physical or conductive, is herein used interchangeably with a signal or bit channel which may consist of one or more physical lines for transmitting a signal. In the case of non-differential signal lines, generally only one physical line is used to transmit one signal. However, in the case of differential signal lines, a pair of physical lines is used to transmit one signal. For example, a bit line or bit channel in an LVDS or IEEE 1394 interface consists of a pair of physical lines which together transmit a signal.*

Figure 10:
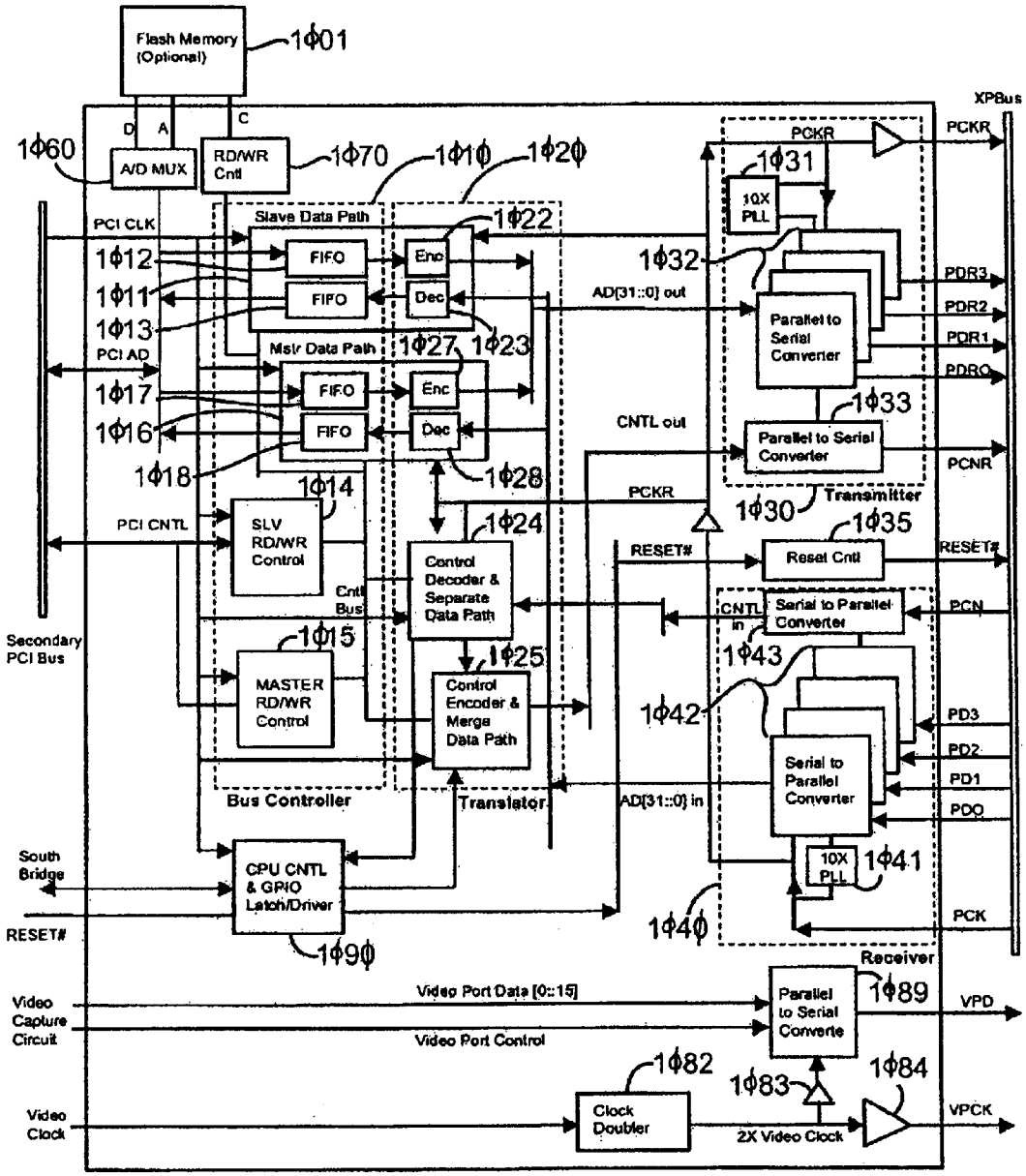
*FIG. 10 is a detailed block diagram of one embodiment of the PIC of the present invention.*

*FIG. 10 is a detailed block diagram of one embodiment of the PIC of the present invention. PIC 1000 is nearly identical to HIC 900 in its function, except that HIC 900 interfaces the*

*host PCI bus to the XPBus while PIC 1000 interfaces the secondary PCI bus to the XPBus. Similarly, the components in PIC 1000 serve the same function as their corresponding components in HIC 900. Reference numbers for components in PIC 1000 have been selected such that a component in PIC 1000 and its corresponding component in HIC 900 have reference numbers that differ by 100 and have the same two least significant digits. Thus for example, the bus controller in PIC 1000 is referenced as bus controller 1010 while the bus controller in HIC 900 is referenced as bus controller 910. As many of the elements in PIC 1000 serve the same functions as those served by their corresponding elements in HIC 900 and as the functions of the corresponding elements in HIC 900 have been described in detail above, the function of elements of PIC 1000 having corresponding elements in HIC 900 will not be further described herein. Reference may be made to the above description of FIG. 9 for an understanding of the functions of the elements of PIC 1000 having corresponding elements in HIC 900.*

*As suggested above, there are also differences between HIC 900 and PIC 1000. Some of the differences between HIC 900 and PIC 1000 include the following. First, receiver 1040 in PIC 1000, unlike receiver 940 in HIC 900, does not contain a synchronization unit. As mentioned above, the synchronization unit in HIC 900 synchronizes the PCKR clock to the PCK clock locally generated by PLL 950. PIC 1000 does not locally generate a PCK clock and therefore, it does not have a locally generated PCK clock with which to synchronize the PCK clock signal that it receives from HIC 900. Another difference between PIC 1000 and HIC 900 is the fact that PIC 1000 contains a video parallel to serial converter 1089 whereas HIC 900 contains a video serial to parallel converter 980. Video parallel to serial converter 1089 receives 16 bit parallel video capture data and video control signals on the Video Port Data [0::15] and Video Port Control lines, respectively, from the video capture circuit (not shown in FIG. 11) and converts them to a serial video data stream that is transmitted on the VPD line to the HIC. The video capture circuit may be any type of video capture circuit that outputs a 16 bit parallel video capture data and video control signals. Another difference lies in the fact that PIC 1000, unlike HIC 900, contains a clock doubler 1082 to double the video clock rate of the video clock signal that it receives. The doubled video clock rate is fed into video parallel to serial converter 1082 through buffer 1083 and is sent to serial to parallel converter 980 through buffer 1084. Additionally, reset control unit 1035 in PIC 1000 receives a reset signal from the CPU CNTL & GPIO latch/driver unit 1090 and transmits the reset signal on the RESET# line to the HIC 1000 whereas reset control unit 945 of HIC 900 receives the reset signal and forwards it to its CPU CNTL & GPIO latch/driver unit 990 because, in the above embodiment, the reset signal RESET# is unidirectionally sent from the PIC 1000 to the HIC 900.*

*Like HIC 900, PIC 1000 handles the PCI bus control signals and control bits from the XPBus representing PCI control signals in the following ways:*

1. *PIC 1000 buffers clocked control signals from the secondary PCI bus, encodes them and sends the encoded control bits to the XPBus;*
2. *PIC 1000 manages the signal locally; and*
3. *PIC 1000 receives control bits from XPBus, translates them into PCI control signals and sends the PCI control signals to the secondary PCI bus.*

*PIC 1000 also supports a reference arbiter on the secondary PCI Bus to manage the PCI signals REQ# and GNT#.*

*The XPBus which includes lines PCK, PD0 to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.*

Figure 11:
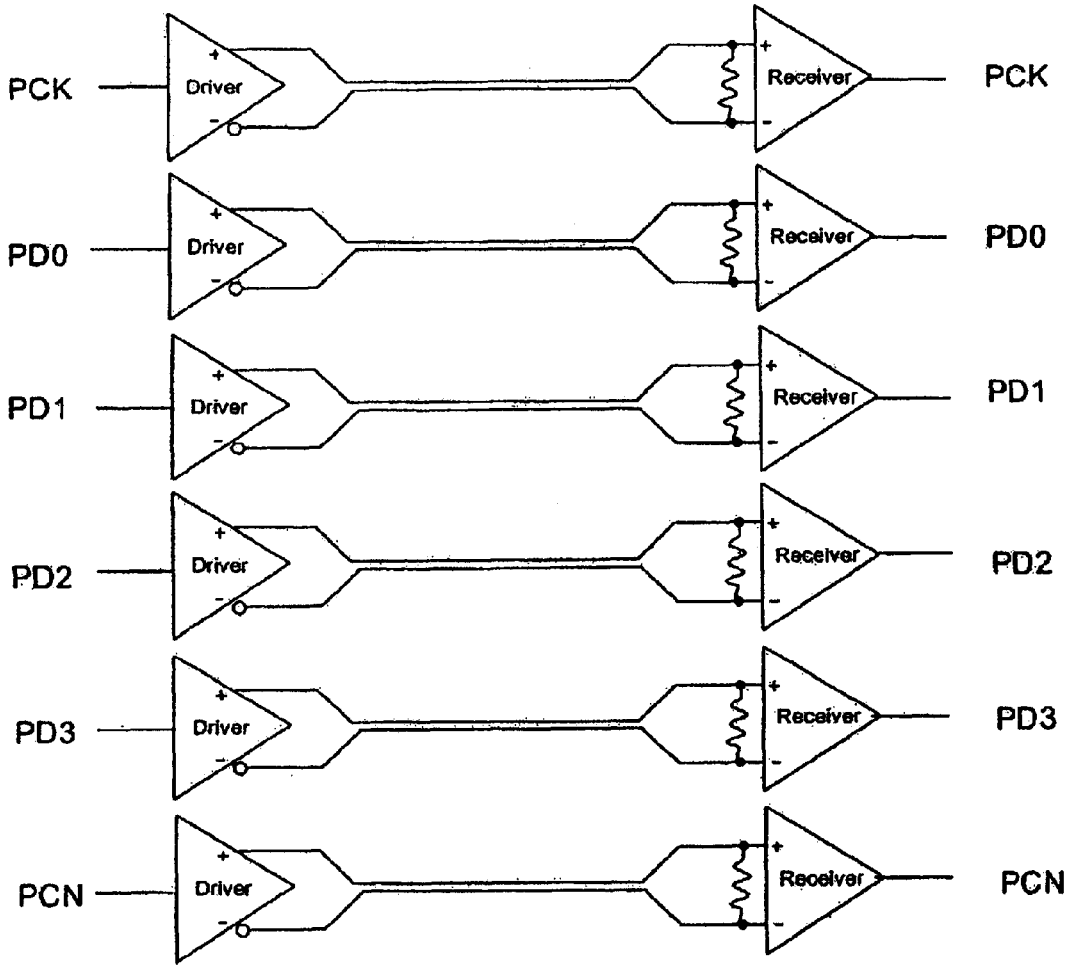
*FIG. 11 is a schematic diagram of the signal lines PCK, PD0 to PD3, and PCN.*

*FIG. 11 is a schematic diagram of lines PCK, PD0 to PD3, and PCN. These lines are unidirectional LVDS lines for transmitting clock signals and bits from the HIC to the PIC. The bits on the PD0 to PD3 and the PCN lines are sent synchronously within every clock cycle of the PCK. Another set of lines, namely PCKR, PDR0 to PDR3, and PCNR, are used to transmit clock signals and bits from the PIC to HIC. The lines used for transmitting information from the PIC to the HIC have the same structure as those shown in FIG. 11, except that they transmit data in a direction opposite to that in which the lines shown in FIG. 11 transmit data. In other words they transmit information from the PIC to the HIC. The bits on the PDR0 to PDR3 and the PCNR lines are sent synchronously within every clock cycle of the PCKR. Some of the examples of control information that may be sent in the reverse direction, i.e., on PCNR line, include a request to switch data bus direction because of a pending operation (such as read data available), a control signal change in the target requiring communication in the reverse direction, target busy, and transmission error detected.*

*The XPBus which includes lines PCK, PD0 to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.*

Figure 12:
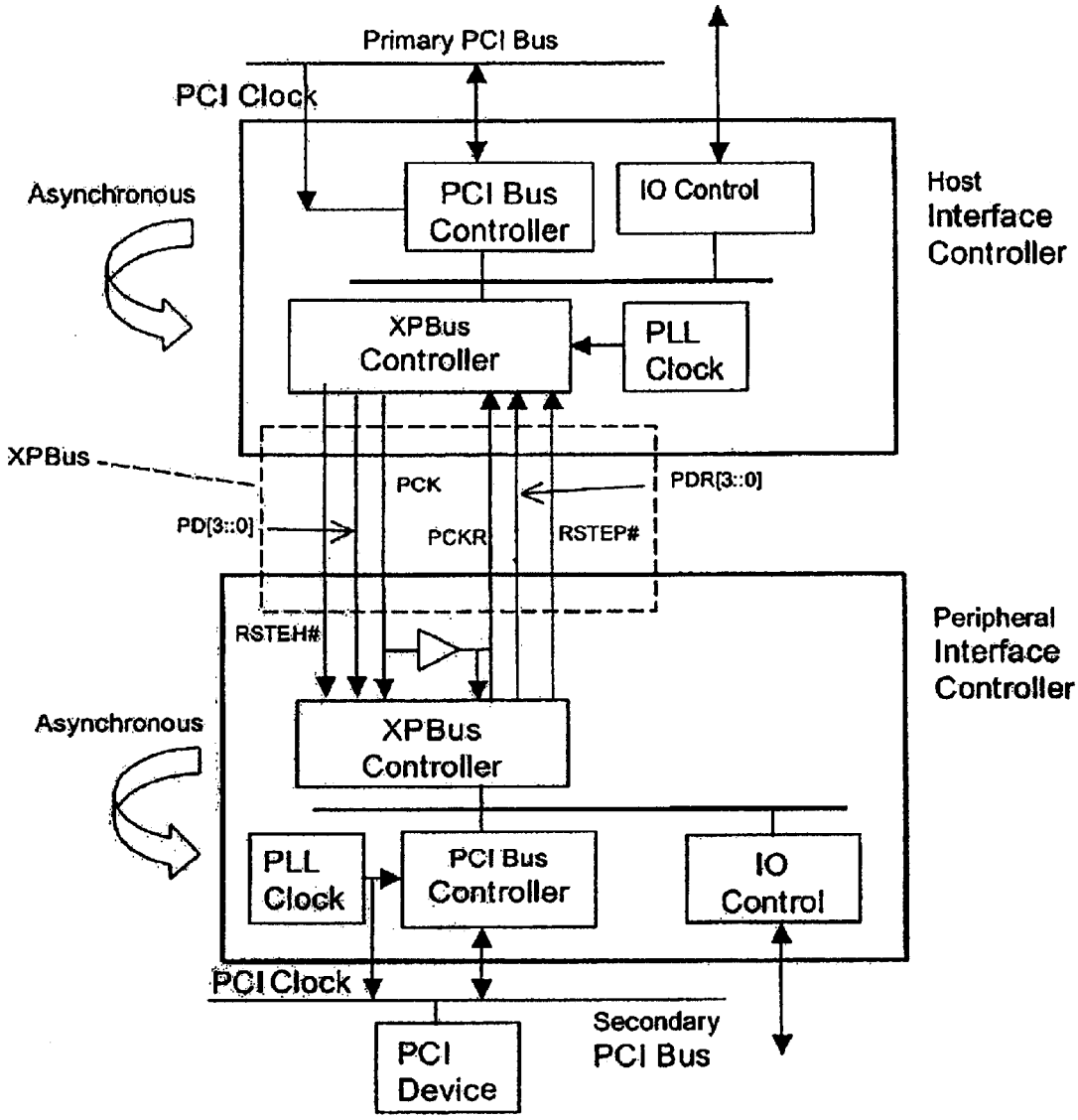
*FIG. 12 is a block diagram of another embodiment of the HIC and PIC of the present invention and the interface therebetween.*

*FIG. 12 is a block diagram of another embodiment of the HIC and PIC of the present invention and the interface therebetween.*

Figure 13:
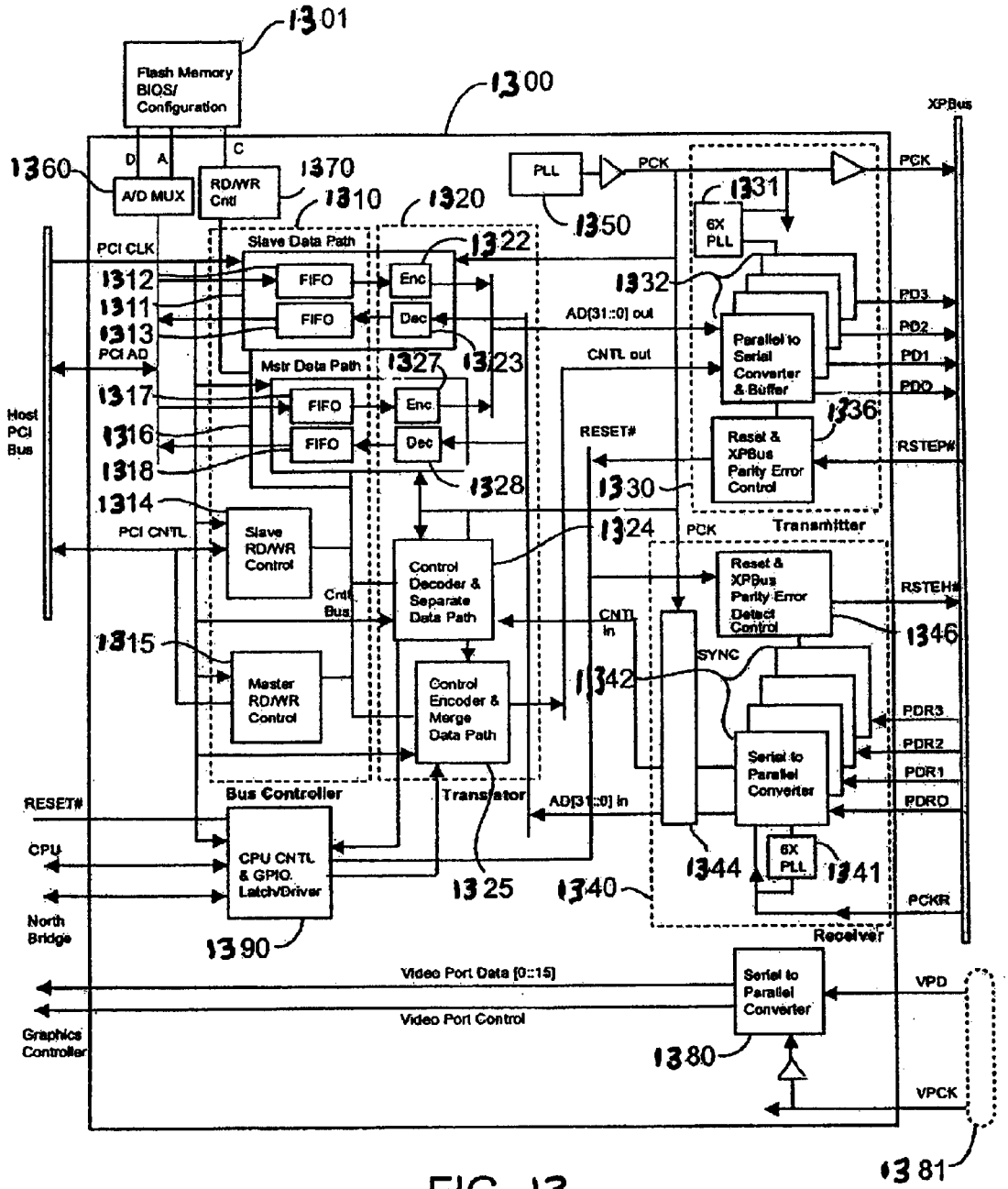
*FIG. 13 is a detailed block diagram of another embodiment of the HIC of the present invention.*

*FIG. 13 shows a detailed block diagrams of the HIC shown in FIG. 12. HIC 1300 shown in FIG. 13 is, other than for a few difference, identical to HIC 900 shown in FIG. 9. Accordingly, reference numbers for components in HIC 1300 have been selected such that a component in HIC 1300 and its corresponding component in HIC 900 have reference numbers that differ by 400 and have the same two least significant digits. One of the differences between HIC 1300 and HIC 900 is the fact that, unlike HIC 900, HIC 1300 does not have a parallel to serial converter or a serial to parallel converter dedicated exclusively to CNTL out and CNTL in signals, respectively. This is due to the fact that XPBus for HIC 1300 does not contain a PCN or PCNR line. Another important difference between HIC 1300 and HIC 900 is the fact that HIC 1300, unlike HIC 900, has two reset lines, RSTEP# and RSTEH#, instead of only one reset line. Reset*

*line RSTEP# is coupled to Reset & XPBus Parity Error Control Unit 1336 which receives, on the reset line RSTEP#, a reset signal and a parity error signal generated by the PIC, sends a reset signal to the CPU CNTL & GPIO latch/driver 1390, and controls retransmission of bits from the parallel to serial converters 1332. Reset & XPBus Parity Error Detection and Control Unit 1346 takes bits from serial to parallel converters 1342, performs a parity check to detect any transmission error, and sends reset and parity error signals to the PIC on the reset line RSTEH#. The reset and parity error signals may be distinguished by different signal patterns and/or different signal durations. In the two reset line system, the reset and error parity signals are transmitted on the same line and it is possible to send a parity error confirmation signal on one line while receiving a reset signal on the other line. Because HIC 1300 provides for parity error detection, the parallel to serial converters 1332 include buffers. The buffers in parallel to serial converters 1332 store previously transmitted bits (e.g., those transmitted within the previous two clock cycles) for retransmission if transmission error is detected and a parity error signal is received on line RSTEP#. It is to be noted that parallel to serial converters 932 do not contain buffers such as those contained in parallel to serial converters 1332 for purposes of retransmission since HIC 900 does not provide for parity error signal detection. Yet another difference between HIC 900 and HIC 1300 is the fact that in HIC 1300 clock multipliers 1331 and 1341 multiply the PCK and PCKR clocks, respectively, by a factor of 6 rather than 10 because the XPBus coupled to HIC 1300 transmits six bit packets instead of ten bit packets during each XPBus clock cycle. Sending a smaller number of bits per XPBus clock cycle provides the benefit of improving synchronization between the data latching clock output by clock multipliers 1331 and 1341 and the XPBus clocks, PCK and PCKR. In another embodiment, one may send 5 or some other number of bits per XPBus clock cycle. As mentioned above, the remaining elements in HIC 1300 are identical to those in HIC 900 and reference to the description of the elements in HIC 900 may be made to understand the function of the corresponding elements in HIC 1300.*

Figure 14:
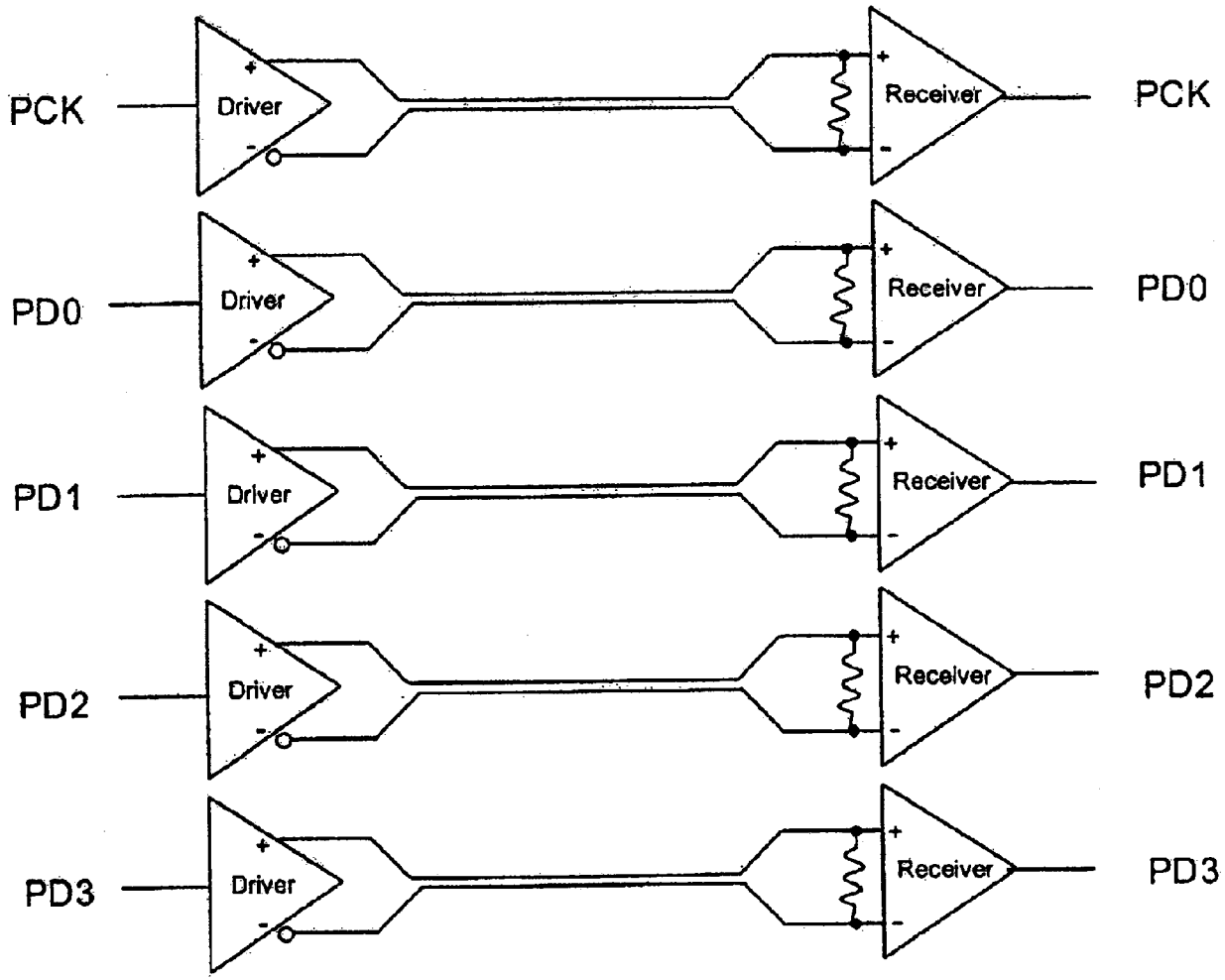
*FIG. 14 is a schematic diagram of the signal lines PCK and PD0 to PD3.*

*FIG. 14 is a schematic diagram of the lines PCK and PD0 to PD3. These lines are unidirectional LVDS lines for transmitting signals from HIC 1300 to the PIC of FIG. 12. Another set of lines, namely PCKR and PDR0 to PDR3, are used to transmit clock signals and bits from the PIC to HIC 1300*

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

[1. A computer module, said module comprising:

an enclosure, said enclosure being insertable into a console;

a central processing unit in said enclosure, said central processing unit comprising a microprocessor based integrated circuit chip;

a hard disk drive in said enclosure, said hard disk drive being coupled to said central processing unit; and a programmable memory device in said enclosure, said programmable memory device being configurable to store a password for preventing a possibility of unauthorized use of said hard disk drive.]

[2. The computer module of claim 1 further comprising a host interface controller for providing a status of a locking device in said enclosure.]

[3. The computer module of claim 1 further comprising a mechanical locking device that is coupled to said programmable memory device.]

[4. The computer module of claim 1 further comprising a host interface controller coupled to a mechanical locking device, said host interface controller being coupled to said programmable memory device.]

[5. The computer module of claim 1 wherein said programmable memory device comprises a flash memory device.]

[6. The computer module of claim 1 wherein said programmable memory device comprises a flash memory device having at least 8 Mbits of cells and greater.]

[7. The computer module of claim 1 further comprising a security program in a main memory.]

[8. The computer module of claim 7 wherein said security program comprises a code for storing a password on said programmable memory device.]

[9. The computer module of claim 8 wherein said security program comprises a code for checking a time from said real-time clock circuit.]

[10. The computer module of claim 1 further comprising a host interface controller coupled to a solenoid that drives a mechanical lock in a first position to a second position.]

[11. The computer module of claim 10 wherein said solenoid also drives said mechanical lock from said second position to said first position.]

[12. The computer module of claim 1 further comprising a real-time clock circuit coupled to said central processing unit.]

[13. The computer module of claim 12 further comprising a battery coupled to a host interface controller that includes said real-time clock.]

[14. A method for operating a computer system, said method comprising:

inserting an attached computer module ("ACM") into a bay of a modular computer system, said ACM comprising a microprocessor unit coupled to a mass memory storage device;

applying power to said computer system and said ACM to execute a security program, said security program being stored in said mass memory storage device; and prompting for a user password from a user on a display.]

[15. The method of claim 14 wherein said ACM comprises an enclosure that houses said microprocessor unit and said mass memory storage device.]

[16. The method of claim 14 further comprising providing a user password to said security program.]

[17. The method of claim 14 further comprising a flash memory device for storing a desired password for said ACM.]

[18. The method of claim 17 wherein said flash memory device maintains said desired password when power is removed from said ACM.]

[19. The method of claim 18 wherein said flash memory device is coupled to a host interface controller that is coupled to said microprocessor based unit.]

[20. The method of claim 14 wherein said mass memory storage device comprises a code directed to comparing said user password with a desired password.]

[21. The method of claim 14 further comprising identifying a permanent password or user code on said attached computer module.]

[22. The method of claim 21 wherein said permanent password or user code is stored in said microprocessor unit.]

[23. The method of claim 21 wherein said permanent password or user code is stored in a flash memory device coupled to said microprocessor unit.]

*24. A computer system comprising:*

*a console comprising,*

*a primary power supply, and*

*a first low voltage differential signal (LVDS) channel comprising two unidirectional serial channels that transmit data in opposite directions; and*

*a computer module configured to be operational only upon insertion into said console and receiving power from said primary power supply, said computer module comprising,*

*an enclosure insertable into the console,*

*a central processing unit in said enclosure, said central processing unit comprising a microprocessor based integrated circuit chip,*

*a hard disk drive in said enclosure, said hard disk drive being coupled to said central processing unit,*

*a second low voltage differential signal (LVDS) channel comprising two unidirectional serial channels that transmit encoded data of Peripheral Component Interconnect (PCI) bus transaction, and*

*a programmable memory device in said enclosure, said programmable memory device being configurable to store a password for preventing a possibility of unauthorized use of said hard disk drive.*

*25. The computer system of claim 24 wherein the first LVDS channel couples to the second LVDS channel upon insertion.*

*26. A computer system comprising:*

*a console comprising,*

*a primary power supply, and*

*a first low voltage differential signal (LVDS) channel comprising two unidirectional serial channels that transmit encoded data of Peripheral Component Interconnect (PCI) bus transaction; and*

*a computer module configured to be operational only upon insertion into said console and receiving power from said primary power supply, said computer module comprising,*

*an enclosure insertable into the console,*

*a central processing unit in said enclosure, said central processing unit comprising a microprocessor based integrated circuit chip,*

*a hard disk drive in said enclosure, said hard disk drive being coupled to said central processing unit,*

*a second low voltage differential signal (LVDS) channel comprising two unidirectional serial channels that transmit data in opposite direction,*

*an interface controller coupled to the second LVDS channel, and*

*a programmable memory device in said enclosure, said programmable memory device being configurable to store a password for preventing a possibility of unauthorized use of said hard disk drive.*

*27. The computer system of claim 26 wherein the first LVDS channel couples to the second LVDS channel upon insertion.*

*28. A method for operating a computer system, said method comprising:*

*inserting an attached computer module ("ACM") into a bay of a console of a modular computer system, the console comprising,*

*a primary power supply,*

*a LAN communication device, and*

*a first low voltage differential signal (LVDS) channel comprising two unidirectional serial channels transmitting data in opposite direction,*

*said ACM configured to be operational only upon insertion into said console and receiving power from said primary power supply, said ACM comprising*

*a microprocessor unit coupled to a mass memory storage device, and*

*a second low voltage differential signal (LVDS) channel comprising two unidirectional serial channels transmitting encoded data of Peripheral Component Interconnect (PCI) bus transaction in opposite direction;*

*applying power to said computer system and said ACM to execute a security program, said security program being stored in said mass memory storage device; and prompting for a user password from a user on a display.*

*29. The method of claim 28 wherein the mass memory storage device comprises flash memory.*

*30. The method of claim 28 wherein the mass memory storage device comprises a hard disk drive.*

* * * * *